INVENTORS
K.H.FREILINGHAUS, J.L.LANGDON
AND A.W.WETMORE
BY Forest B. Hitchcock
THEIR ATTORNEY INVENTORS
K.H.FRIELINGHAUS, J.L.LANGDON
AND A.W.WETMORE
BY Forest B. Hitchcock
THEIR ATTORNEY

AUTOMATIC SWITCHING SYSTEM

Filed June 12, 1963

12 Sheets-Sheet 3

INVENTORS
K.H.FREILINGHAUS, J.L.LANGDON
AND A.W.WETMORE
BY
Forest B. Hitchcock
THEIR ATTORNEY

INVENTORS
K.H.FRIELINGHAUS, J.L.LANGDON
BY AND A.W.WETMORE

Forest B. Hitchcock
THEIR ATTORNEY

INVENTORS
K.H.FRIELINGHAUS, J.L.LANGDON
AND A.W.WETMORE
BY
Forest B. Hitchcock
THEIR ATTORNEY Feb. 28, 1967 K. H. FRIELINGHAUS ETAL 3,307,031

AUTOMATIC SWITCHING SYSTEM

Filed June 12, 1963 12 Sheets-Sheet 6

INVENTORS
K.H.FRIELINGHAUS, J.L.LANGDON
BY AND A.W.WETMORE
Forest W. Hillbeach
THEIR ATTORNEY INVENTORS
K.H.FREILINGHAUS, J.L.LANGDON
AND A.W.WETMORE
BY Forest B. Hitchcock
THEIR ATTORNEY

AUTOMATIC SWITCHING SYSTEM

Filed June 12, 1963

INVENTORS
K.H.FRIELINGHAUS, J.L.LANGDON
AND A.W.WETMORE
BY
Forrest B. Hitchcock
THEIR ATTORNEY INVENTORS
K.H.FRIELINGHAUS, J.L.LANGDON
AND A.W.WETMORE
BY Forest B. Hitchcock
THEIR ATTORNEY

AUTOMATIC SWITCHING SYSTEM

Filed June 12, 1963 12 Sheets-Sheet 11

AUTOMATIC SWITCHING SYSTEM

Filed June 12, 1963 12 Sheets-Sheet 12

INVENTORS
K.H.FREILINGHAUS, J.L.LANGDON
AND A.W.WETMORE
BY
Forest B. Hitchcock
THEIR ATTORNEY 3,307,031
AUTOMATIC SWITCHING SYSTEM
Klaus H. Frielinghaus, Rochester, John L. Langdon, North Chili, and Arthur W. Wetmore, West Henrietta, N.Y., assignors to General Signal Corporation, Rochester, N.Y., a corporation of New York
Filed June 12, 1963, Ser. No. 287,236
18 Claims. (Cl. 246—4)

This invention relates to automatic switching systems and more particularly to a system for automatically routing cars of a railroad train to predetermined classification tracks in a classification yard.

In a car classification yard, an incoming train of cars is broken into cuts of one or more cars. Each cut is routed from the primary track on which it originates, over a plurality of route selecting switches, to one of a plurality of classification tracks. To facilitate movement of the cuts to their destination tracks, the novel system described herein automatically operates the various switches ahead of each cut so that the cut will eventually reach its predetermined classification track.

Information as to the route of any selected cut is applied to the system in the form of a binary pulse code. Route description storage means including apertured magnetic cores are provided for the various track switches. The route description designated for each cut is transferred from one route storage to the next as the cut progresses from each track switch to the next subsequent track switch. This transfer is initiated by deenergization of a track relay coupled to a detector track section for the associated track switch.

Prior art automatic switching systems utilizing relays as storage means require large amounts of power for operation, as well as large volume installations. Moreover, use of large quantities of electromechanical devices for storage increases the probability of circuit failure. Solid state devices provide a way of reducing the probability of failure and at the same time greatly reducing power requirements for the system. Passive rather than active solid state devices are more desirable for use in such system because they more readily lend themselves to fail-safe operation, which is an overriding consideration in all automatic switching systems.

The invention generally contemplates a plurality of storage means, each said means including apertured magnetic core means. Each said storage means receives and retains information pertaining to positioning of an individual track switch associated with each particular storage means. As each cut progresses through the classification yard, the switch immediately ahead of the rolling cut is positioned in accordance with a preselected route. This route is determined by track selection means which then applies the route information to successive track switch storage means in accordance with the predetermined route for the particular cut.

Therefore, one object of this invention is to provide an automatic switching system capable of routing vehicles on a primary track over a plurality of route selecting switches through a preselected one of a number of destination tracks, which system includes a plurality of apertured magnetic cores.

Another object of this invention is to provide an automatic switching system utilizing a plurality of columns of apertured magnetic cores, wherein each track switch in a classification yard is controlled by a single core in at least one column of the cores.

Another object of this invention is to provide a system for controlling track switches in a classification yard in accordance with a pulse code modulated signal, wherein the signal can be stored in columns of multiple aperture magnetic cores such that the remanent magnetic state of each core provides a single bit of information in the pulse code modulated signal.

Another object is to provide indication means for signifying presence of a stored word in any storage means independent of the code comprising the word.

Another object is to provide a system for serially transferring information stored in any one column of apertured magnetic cores to any other column of apertured magnetic cores.

Another object is to provide means for controlling a dual primary track classification yard either wholly from a single track selection means or each primary track separately from separate track selection means.

Another object is to provide a compact automatic switching system having low power requirements and which is readily adaptable to modular type construction.

These and other objects and advantages of the invention will become apparent from the following detailed description when read in conjunction with the accompanying drawings, in which.

Figure 2:
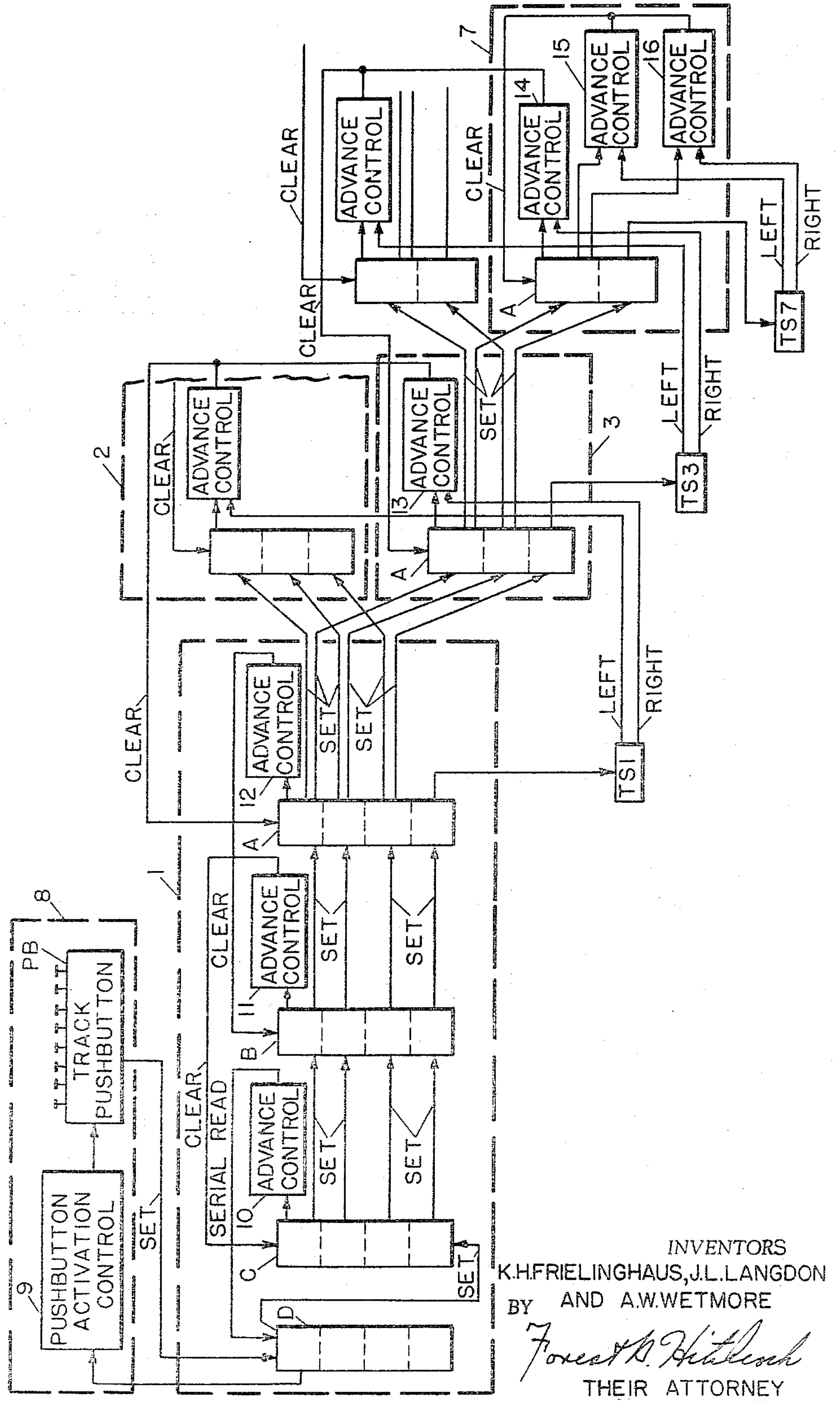
FIG. 2 is a block diagram of a single primary track car classification yard for a single predetermined route signal path.
Figures 3A, 8:
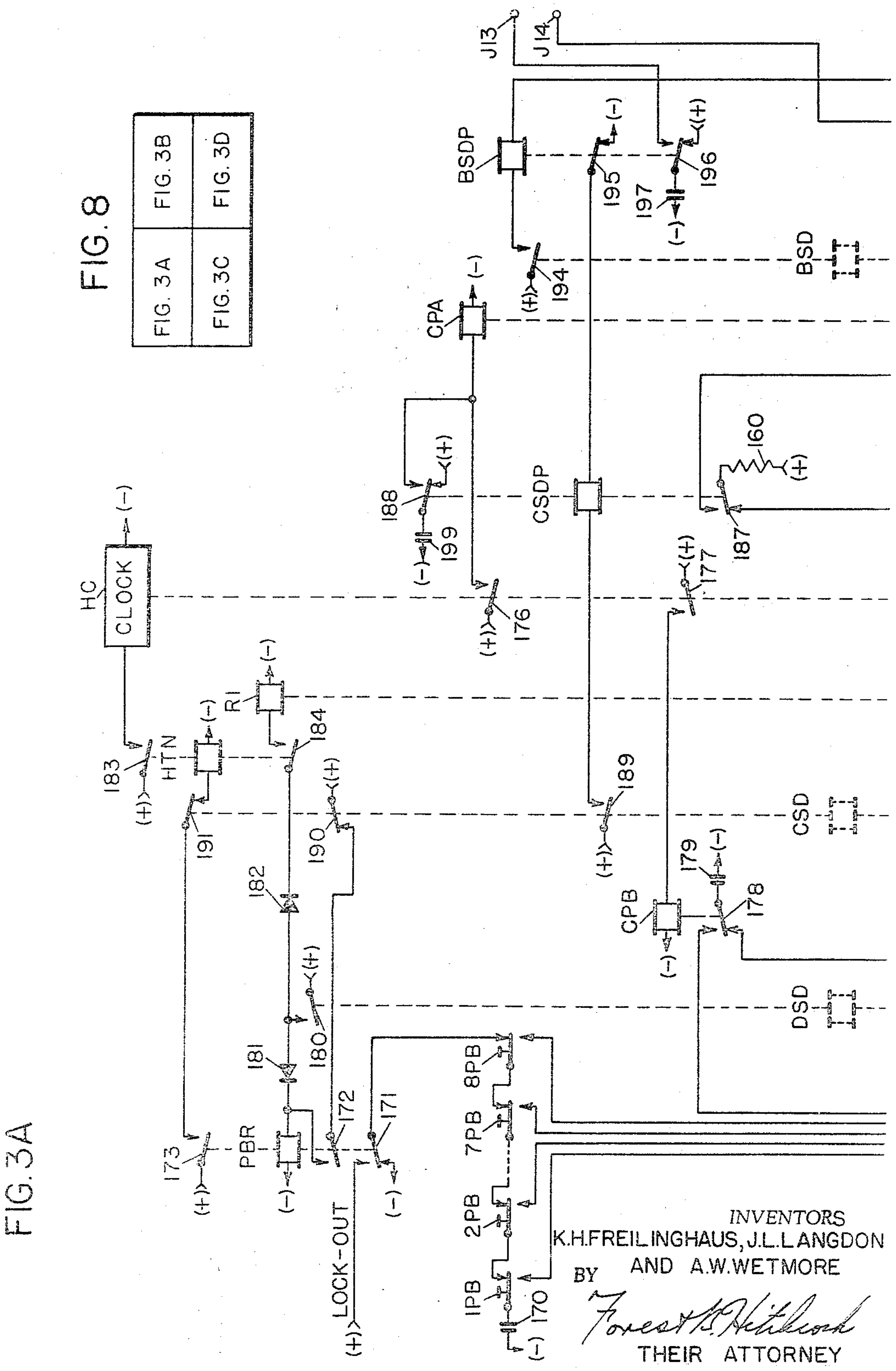

FIGS. 3A, 3B, 3C and 3D when assembled as shown in FIG. 8, illustrate schematically the control system shown in block diagram form in FIG. 2.

Figure 4A:
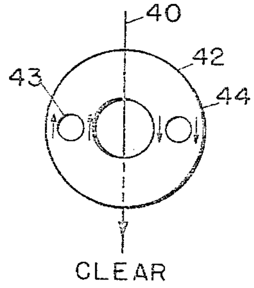

FIG. 4A is an illustration of flux paths in an apertured magnetic core in a clear magnetic state induced by current flow through the major aperture.

Figure 4B:
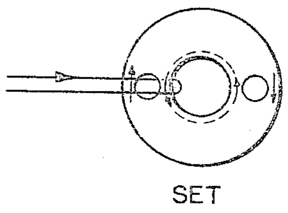

FIG. 4B is an illustration of flux paths in an apertured magnetic core in a set magnetic state induced by current flow through the major and a minor aperture.

Figure 3B:
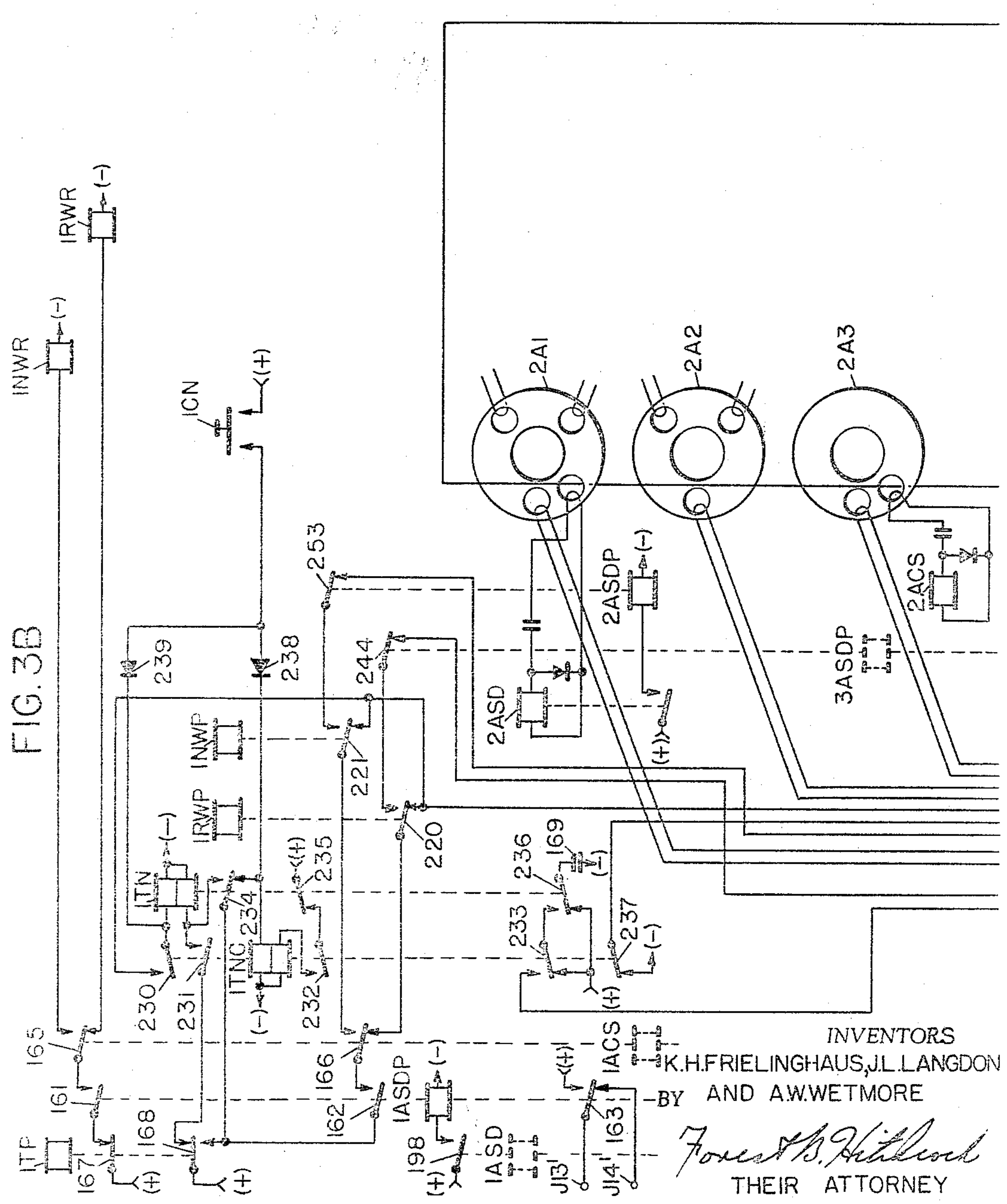
Figure 3C:
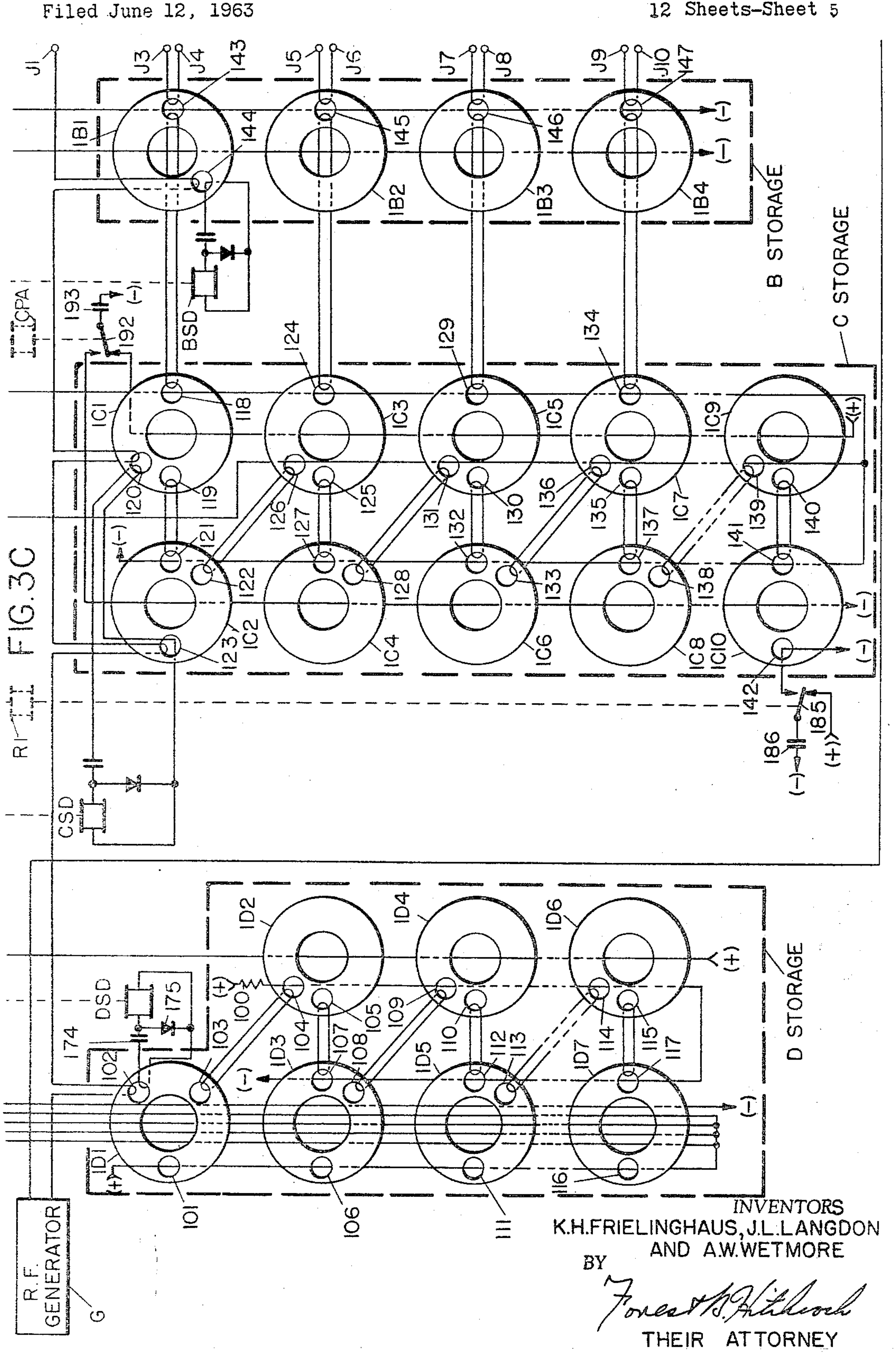
Figure 3D:
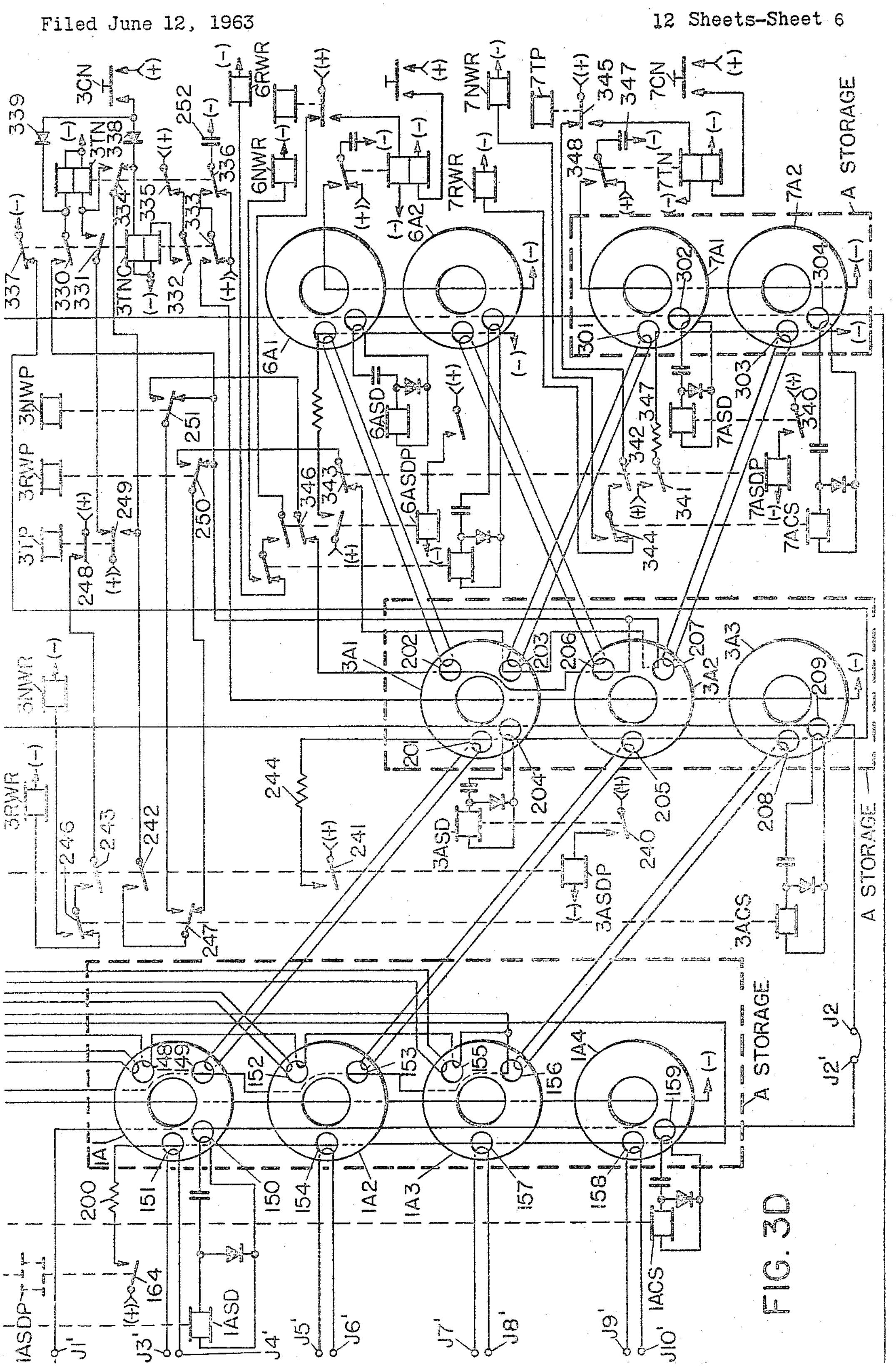
Figure 5:
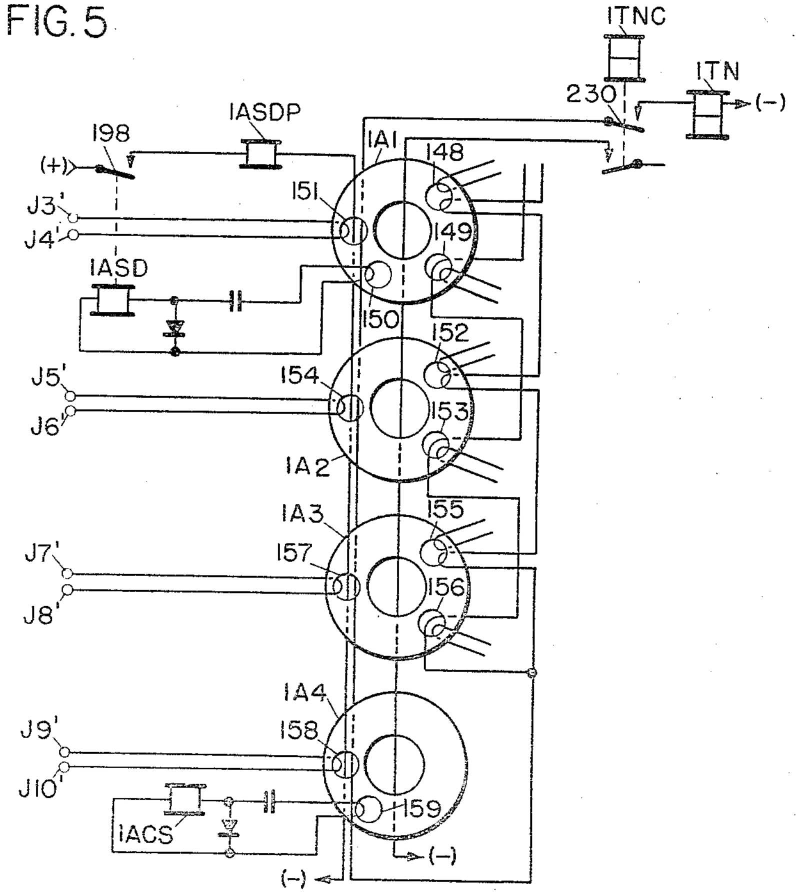

FIG. 5 is a schematic diagram of an alternative A storage for FIG. 3D, to be used for controlling track switch TS1.

Figure 6A:
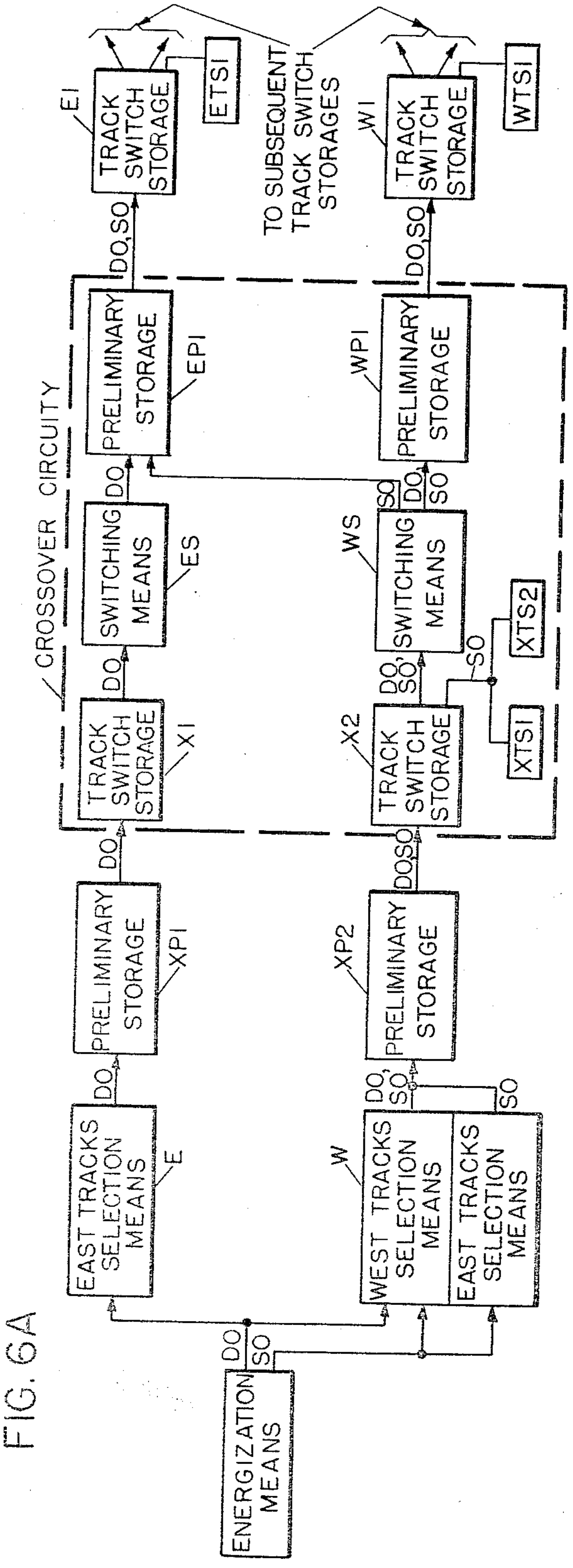

FIG. 6A is a functional block diagram of a simplified car classification yard control system having two primary tracks.

Figure 6B:
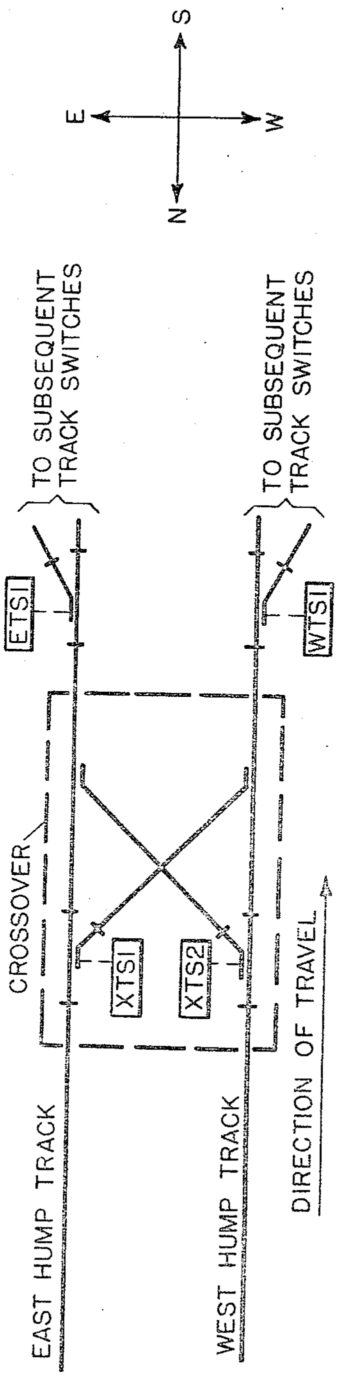

FIG. 6B is a diagrammatic representation of the track layout for a simplified dual primary track car classification yard.

Figures 7A, 9:
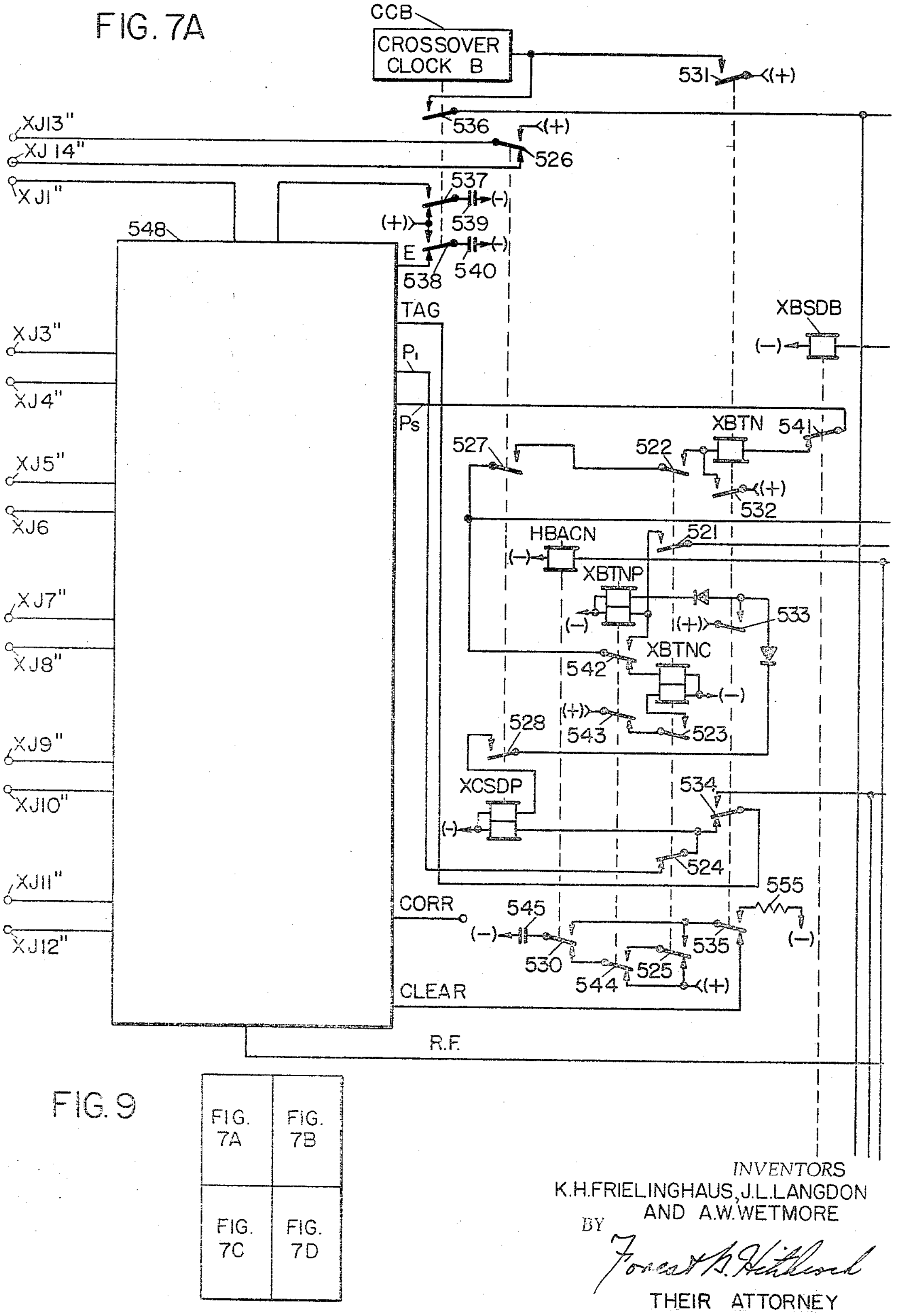
Figure 7B:
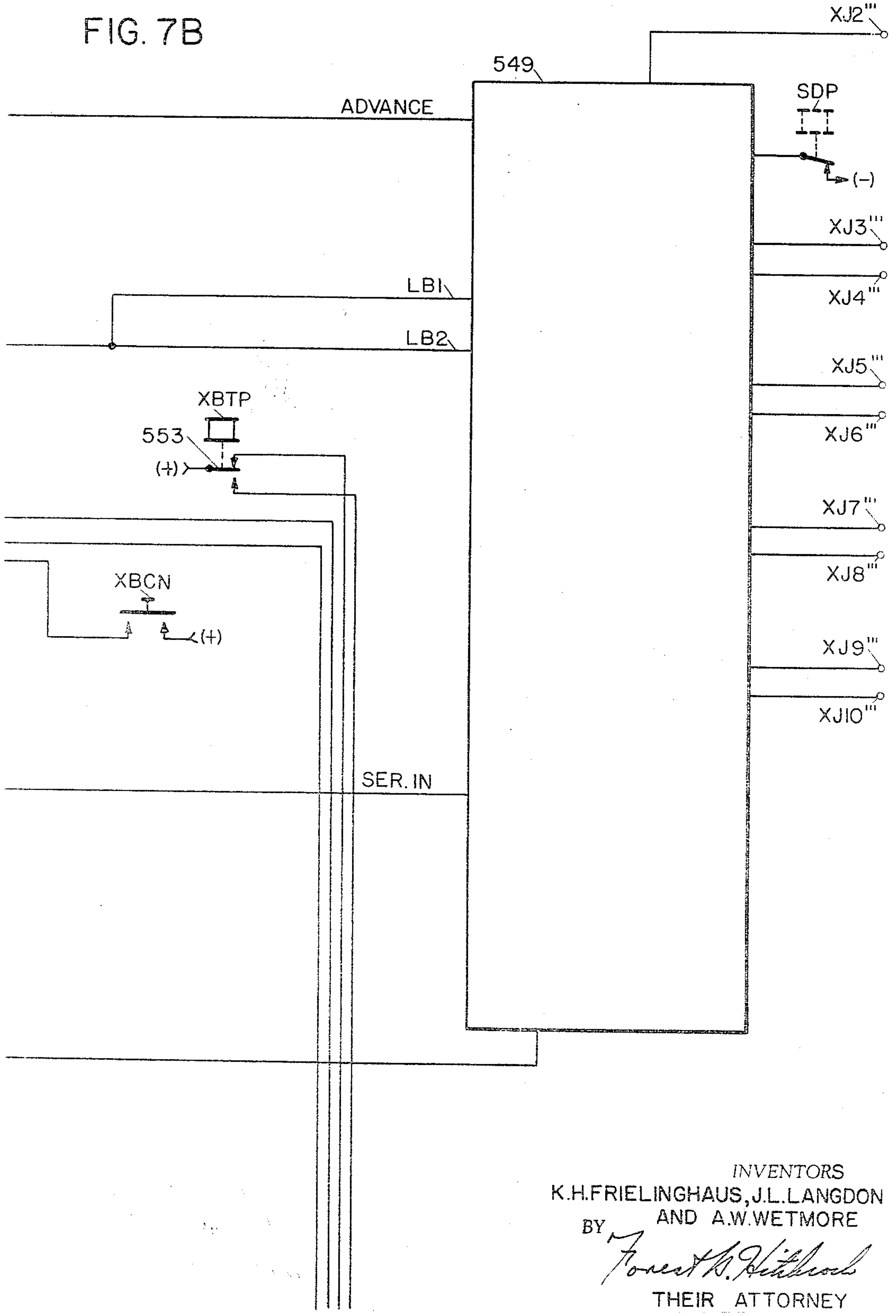
Figure 7C:
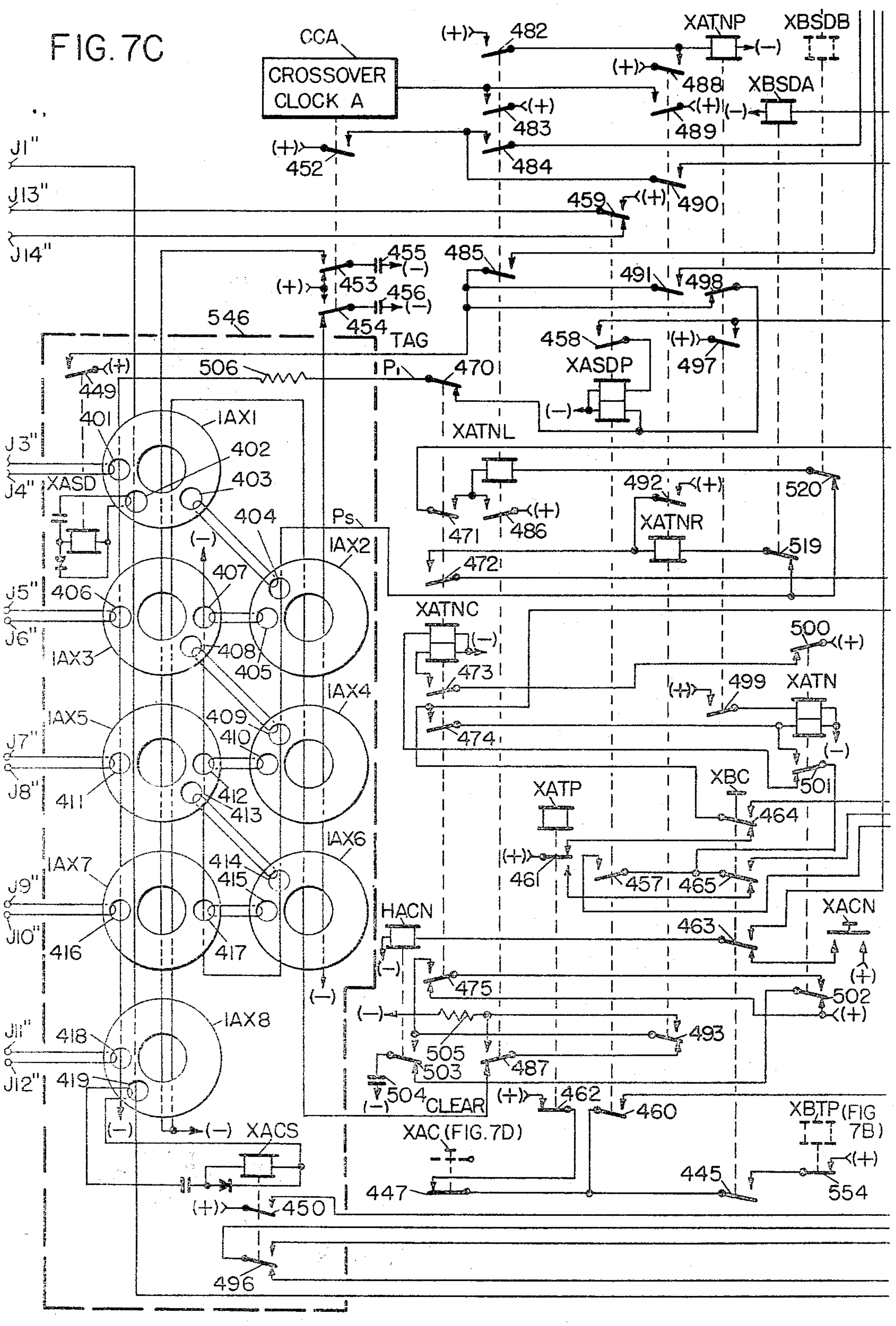

FIGS. 7A, 7B, 7C and 7D, when arranged as shown in FIG. 9, constitute a schematic diagram of control means for crossover switches utilized in a dual primary track car classification yard.

FIG. 8 illustrates how the drawings of FIG. 3 are to be assembled.

FIG. 9 illustrates how the drawings of FIG. 7 are to be assembled.

Figure 1A:
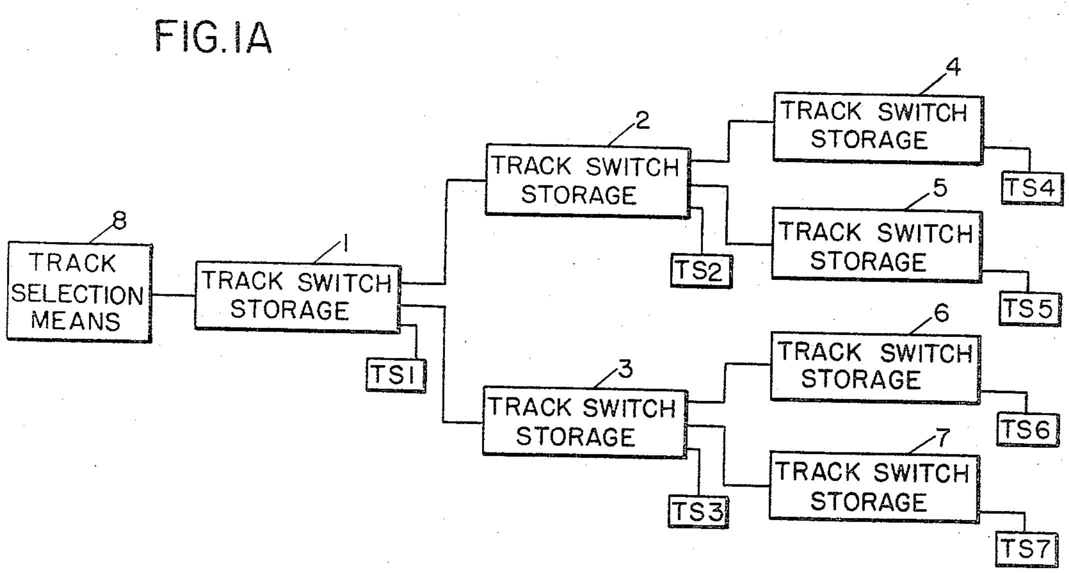
FIG. 1A is a general block diagram of a typical single primary track automatic car classification system.
Figure 1B:
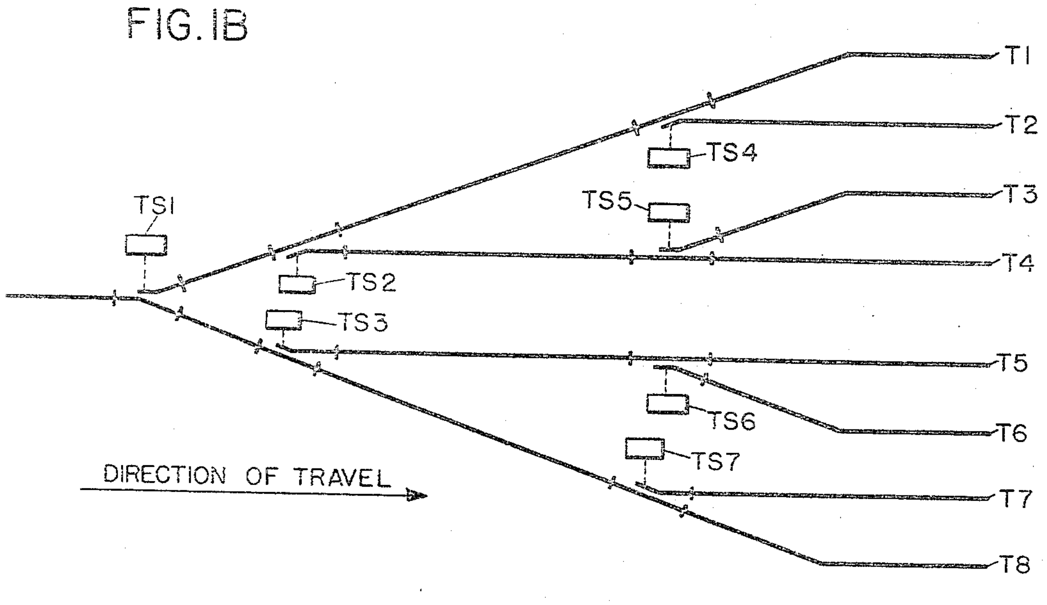
FIG. 1B illustrates a typical track layout for a car classification system.

Turning first to FIGS. 1A and 1B, there is shown control means for operating the switches in a simplified car classification yard. Each track switch TS1–TS7 is controlled by a separate, correspondingly designated track switch storage 1–7. Track selection means 8 are coupled to track switch storage 1 in order to control the position of track switch TS1. Depending upon the position of switch TS1, when the rolling cut passes track switch TS1 the track selection signal is subsequently coupled to either track switch storage 2 or track switch storage 3 depending upon whether track switch TS1 transferred the cut to the right or the left. For example, if the cut is transferred to the left by track switch TS1, track switch storage 2 receives a signal from track switch storage 1 for positioning track switch TS2 in the proper direction so as to transfer the rolling cut either to the left or the right, depending upon whether the rolling cut is destined for one of tracks T1 and T2 or one of tracks T3 and T4. If it be assumed, for example, that the cut is destined for track T4 of FIG. 1B, track switch TS2 transfers the rolling cut to the right, so that when the cut passes track switch TS2, the route signal is transferred to track switch storage 5 wherein it positions track switch TS5 to transfer the rolling cut to the right. The cut thereby reaches its destination track T4.

Turning now to FIG. 2, there is shown a more detailed block diagram of a portion of the system shown in FIG. 1A. The portion shown comprises those storage means required to establish a route to tracks T7 or T8 as shown in FIG. 1B. Track switch storage 1 of FIG. 1A corresponds to the equipment shown within dotted enclosure 1 of FIG. 2, track switch storage 3 corresponds to the equipment shown within dotted enclosure 3 of FIG. 2 and track switch storage 7 corresponds to the equipment shown within dotted enclosure 7. The track selection means of FIG. 1A is illustrated by the equipment shown within dotted enclosure 8 of FIG. 2. This equipment comprises a set of track push buttons PB for selecting a route, and a push button activation control 9 for permitting route selection only when the first column of storage means in track switch storage 1 is clear. If the first column of storage means in track switch storage 1 is not clear, a lock-out signal is applied to push buttons PB, preventing a new code from being applied to the storage means. It should be noted that the track selection means is not limited to push button controls, but instead may comprise readout equipment for signals stored upon any suitable recording medium, such as a punched card readout or magnetic tape readout for systems wherein route information is respectively stored upon punched cards or magnetic tape.

Track switch storage 1 comprises a suitable number of columnar storage means, such as four. This quantity of columnar storage means is dependent upon the number of cuts which may occupy the primary track prior to encountering track switch TS1. The columns are designated D, C, B and A, in advancing order, for the purpose of illustrating the order of signal flow. The columns serve to store route information as well as to successively transfer route information from the track selection means to the D column, the C column, the B column, and thence the A column. From the A column, the information is transferred to track switch storage 2 or track switch storage 3, also comprising columnar storage means, depending upon whether the cut is to transfer to the left or the right.

If it be assumed that the cut is to transfer to the right, the route information flows from track switch storage 1 to track switch storage 3. From track switch storage 3, if it be assumed that the cut is to transfer to the right, the route information then advances to track switch storage 7. Track switch storage 7 also comprises columnar storage means. Track switch TS7 is positioned from track switch storage 7 to transfer the cut either to track T7 or to track T8.

Only one column of storage means is shown for every track switch storage other than track switch storage 1. The reason for this is an assumption that only one cut may be present between any pair of track switches at any given time. However, if the classification yard should be sufficiently large so that more than one cut may be present on the track between any pair of switches, then additional columns of storage means may be added to the track switch storages controlling the succeeding one of the pair of track switches. Although this condition is often the case, for simplicity of explanation only single columns of storage means are shown for all track switch storages except track switch storage 1. It is to be understood however, that additional columns of storage means may be added to any track switch storage requiring such additional storage means. The operation of such track switch storage is similar to that explained below in connection with operation of track switch storage 1.

In operation, assume that the classification yard is completely empty and no cuts are progressing through the yard under influence of gravity due to existence of a hump along the primary track upstream of track switch TS1. Assume further that no signals are stored in any of the storage means. If a first cut to be classified is then brought onto the primary track and a destination track is selected by pressing the desired track push button, a predetermined code is read into the D storage of track switch storage 1. This has the effect of setting certain apertured magnetic cores within the D storage. The code is so arranged that irrespective of the overall code, the signal applied to the uppermost core in the column comprises a binary ONE. This binary ONE is hereinafter referred to a tag bit for indicating that a binary code is stored in that particular column of apertured cores. During the interval in which a code is stored in the D storage of track switch storage 1, the push button activation control locks out the track push buttons to prevent the possibility of another code being applied to the D storage of track switch storage 1 before the code within the D storage has had an opportunity to be transferred to the C storage. However, once the code is transferred out of the D storage and into the C storage, an advance control circuit 10 applies a signal to the pushbutton activation control of the D storage, causing the control to remove the lock-out signal from the track push buttons, thereby permitting a new code to be applied to the D storage.

The coded signal stored in the D storage is serially transferred to the C storage; that is, the signal is serially transferred upward out of the D storage and upward into the C storage. When the tag bit formerly stored in the uppermost core of the D storage, is transferred to the C storage, it eventually is applied to the uppermost core in the C storage. At this time, advance control circuit 10 coupled to the C storage senses the tag bit and in response thereto halts the serial transfer operation in both the C and D storages and removes the lock-out signal from the track push buttons. This enables application of a new route signal for a succeeding cut to be applied to the D storage.

Since the B storage is clear, as previously hypothesized, an advance control circuit 11 senses the clear condition of the uppermost core in the B storage, and thereupon applies a clear signal to the C storage. The clear signal induces destructive readout from the C storage, which is parallel-coupled to the B storage such that the information stored in the uppermost core of the C storage is directly applied to the uppermost core of the B storage, the information stored in the second from the uppermost core in the C storage is directly applied to the second from the uppermost core in the B storage, and so on. The C storage is now clear, permitting any information stored within the D storage to be transferred to the C storage. This leaves the D storage clear, removing the lock-out signal on the track push buttons, again permitting the route for a third cut to be selected.

When a signal is stored within the B storage, an advance control circuit 12 coupled to the uppermost core of the A storage senses the clear condition of the core, and thereupon couples a clear pulse to the B storage, causing destructive readout to the A storage of the signals stored in the B storage. Parallel readout from the B storage to the A storage is employed in a manner similar to that employed for parallel readout from the C storage to the B storage. When the B storage is thereby cleared, the signal stored in the C storage is transferred to the B storage, the signal stored in the D storage is transferred to the C storage, and the lock-out signal applied to the track push button is removed, permitting application of a route code to the circuit for a fourth cut.

When a code reaches the A storage, the lowermost core in the A storage provides positioning information for the track switch associated with the particular A storage. The track switch is thus positioned in accordance with the information contained in the lowermost core of the A storage.

Every track switch in the car classification yard has associated therewith a detector track section extending a short distance behind and ahead of the track switch. When a rolling cut enters the detector track section, the detector track is shunted, thereby deenergizing a track relay associated therewith. Upon deenergization of the track relay, if the track switch is properly positioned, the route information signal is transferred to the proper subsequent track switch storage. Thus, when track switch TS1 is positioned to the right, and the detector track relay (not shown) associated with track switch TS1 is deenergized, a clear signal is coupled to the A storage from an advance control circuit 13 in track switch storage 3, destructively clearing the A storage and causing parallel transfer of the information stored in the A storage of track switch storage 1 to the A storage in track switch storage 3. The direction of transfer from the A storage of track switch storage 1 is controlled by the information applied to the lowermost core of the A storage in track switch storage 1. The information thus applied to the lowermost core of the A storage in track switch storage 1 is thereby utilized, making its transfer to a subsequent track switch storage unnecessary. Thus, the information stored in the lowermost core of the A storage in track switch storage 1 is not transferred to the A storage of track switch storage 3.

As previously explained, when information is transferred out of the A storage in track switch storage 1, advance control circuit 12 causes transfer of information stored in the B storage to the A storage. The information stored in the C storage is then transferred to the B storage, and the information stored in the D storage is then transferred to the C storage. The lock-out signal applied to the track push button is thereby removed, permitting a new code to be applied to the system.

In similar fashion, when the first rolling cut reaches the detector track section of track switch TS3, shown in FIG. 1B, a track relay (not shown) associated with the detector track section for track switch TS3 is deenergized. If track switch TS3 is positioned in the proper direction, as determined by the lowermost core in the A storage of track switch storage 3, information is transferred in parallel fashion from all but the lowermost core in the A storage of track switch storage 3 to the A storage of track switch storage 7. Again, direction of transfer from the A storage of track switch storage 3 to the A storage of track switch storage 7 is determined by the remanent magnetic state of the lowermost core in the A storage of track switch storage 3. Upon this transfer of information, the D storage of track switch storage 1 again clears, the lock-out signal applied to the track push buttons is again removed, and a new route may be set up in the D storage of track switch storage 1.

In like fashion, the position of track switch TS7 is determined in accordance with the remanent magnetic state of the lowermost core in the A storage of track switch storage 7. Thus, when the first rolling cut enters upon the detector track section associated with track switch TS7, a detector track relay (not shown) associated therewith deenergizes. Depending upon whether the cut is to be transferred to the right or the left, either advance control circuit 15 or 16, both of which are coupled to the uppermost core of the A storage in track switch storage 7, applies a clear signal to the cores of the A storage in track switch storage 7. This clears the A storage of track switch storage 7, permitting acceptance of the code from the A storage in track switch storage 3 for the next cut destined to pass over track switch TS7. Again, as previously explained, a reaction occurs all the way back through the system to the D storage of track switch storage 1, emptying the D storage and subsequently removing the lock-out signal applied to the track push buttons, permitting application of another code to the D storage.

It should be remembered that although the system of FIG. 2 has been explained in connection with a simple car classification yard having merely eight destination tracks, operation of the system for any size car classification yard is similar, since the systems heretofore described constitute building blocks for large car classification yards of any desired size. The basic principal of operation is substantially similar in such classification yards, independent of size. Furthermore, although it is rarely necessary, additional columns of cores may be added to any track switch storage in order to increase the storage capabilities in conjunction with the particular track switch to be controlled.

Referring now to FIGS. 3A–3D for a still further detailed description of the system shown in FIGS. 1A and 2, there is shown in detail the construction of the D, C, B and A storages which make up track switch storage 1, the A storage included in track switch storage 3, and the A storage included in track switch storage 7. The D storage is seen to be made up of seven apertured magnetic cores, 1D1–1D7. Cores 1D1, 1D3, 1D5 and 1D7 are arranged in a first column, while cores 1D2, 1D4 and 1D6 are arranged in a second column. For purposes of controlling a car classification yard as depicted in FIG. 1B, a group of eight destination track push buttons are required. For simplicity, only four push buttons designated 1PB, 2PB, 7PB and 8PB are shown. Each push button has a front and back contact. The push buttons are series-connected through their front contacts, while their back contacts are coupled through the major aperture of core 1D1, and thence through the major apertures of cores 1D3, 1D5 and 1D7 in coded fashion such that the signal produced by operation of a push button may be coupled through the major aperture of one or more of cores 1D3, 1D5 and 1D7. A signal coupled through any of these major apertures tends to set the core through which it is coupled. The windings threading the major apertures from the push buttons are all commoned at the end of the column and returned through a single minor aperture in each of the cores as a single wire; that is, through minor apertures 116, 111, 106 and 101 of cores 1D7, 1D5, 1D3 and 1D1, respectively. Thus, depression of any push button causes set current to flow through the major apertures of the cores coupled thereto, setting only those cores. In large car classification yards having many destination tracks, a great number of code wires are required. For this reason, the code wires setting the cores are threaded through the major apertures, thereby providing greater area for accommodation of the wires. By returning the set current through a minor aperture in each core, set current amplitude need not be closely controlled, as compared to setting through major apertures only.

A relay DSD is coupled to a minor aperture 102 of core 1D1 through a capacitor 174. A diode 175 is connected in parallel with the relay. Radio frequency energy is coupled through minor aperture 102 from a radio frequency signal generator G. During intervals in which core 1D1 is set, the radio frequency signal alternately primes and non-destructively reads out information from core 1D1 through minor aperture 102. Thus, on one-half cycle, current flows from minor aperture 102 through capacitor 174 and diode 175 in the forward direction, causing the capacitor to acquire a charge. On the next half cycle, diode 175 is reverse-polarized so that current from minor aperture 102 must pass through the coil of relay DSD. The energy stored in capacitor 174 is polarized in a direction to aid this current flow, thereby retaining relay DSD in the energized condition with a voltage amplitude exceeding that produced from minor aperture 102 alone. On the other hand, when core 1D1 is clear, relay DSD is deenergized. It will be noted that every relay coupled to a minor aperture of a set core and energized by radio frequency energy is connected in series with a capacitor and has a diode connected in parallel therewith. This assures relay energization when the core coupled thereto is set.

Minor apertures 107, 112, 117, 114, 109 and 104 of cores 1D3, 1D5 1D7, 1D6, 1D4 and 1D2, repectively, receive steady direct current at all times, for priming, through a current limiting resistor 100. Output from minor aperture 107, 112 and 117 is coupled to minor apertures 105, 110 and 115 of cores 1D2, 1D4 and 1D6, respectively. Output from minor apertures 104, 109 and 114 is coupled to minor apertures 103, 108 and 113 of cores 1D1, 1D3 and 1D5, respectively.

A clock generator HC having front contacts 176 and 177 is provided in the system. These contacts are driven by the clock at a suitable rate, such as 20 pulses per second. Thus, while clock generator HC alternately operates contact 177, a relay CPB coupled to contact 177 alternately energizes and deenergizes, thereby alternately closing its front and back contacts 178. The heel of contact 178 is coupled through a capacitor 179 to the negative terminal of the direct current supply. Thus, when relay CPB is energized, front contact 178 discharges capacitor 179 through the major apertures of cores 1D1, 1D3, 1D5 and 1D7, clearing the cores. When the relay deenergizes, back contact 178 closes, coupling energy through the major apertures of cores 1D2, 1D4 and 1D6, thereby clearing these cores. Therefore, when relay CPB energizes, cores 1D3, 1D5 and 1D7 transfer information as to their remanent magnetic states to cores 1D2, 1D4 and 1D6, respectively. When relay CPB deenergizes, cores 1D2, 1D4 and 1D6 transfer energy indicative of their remanent magnetic states to cores 1D1, 1D3 and 1D5, respectively. When relay CPB again energizes, cores 1D3, 1D5 and 1D7 again transfer information as to their remanent magnetic states to cores 1D2, 1D4 and 1D6, respectively, and so on. It should be noted that cores 1D1–1D7 as shown within dotted enclosure D represent the D storage shown in block diagram form in FIG. 2 and that cores 1D1, 1D3, and 1D5 are at the same column level as cores 1D2, 1D4 and 1D6, respectively.

Each time relay DSD energizes, indicating that core 1D1 is set, its front contact 180 closes, energizing relay PBR through a forward-connected diode 181. This causes front contacts 171, 172, and 173 of relay PBR to close. When front contact 171 closes, capacitor 170 acquires a charge through the series-connected push button front contacts. While capacitor 170 remains charged, depression of any push button does not initiate current flow, since no potential difference exists between the back contact of the depressed push button and the common connection for the conductors coupled through the major apertures of cores 1D1, 1D3, 1D5 and 1D7 from the push buttons. Thus, a new code cannot be applied to the D storage until relay PBR is again deenergized, permitting capacitor 170 to discharge through back contact 171.

While relay PBR is energized, front contacts 172 and 173 are closed. Contact 172 causes relay PBR to stick until a code is transferred from the D storage to the C storage comprising cores 1C1–1C10. Front contact 173 energizes a relay HTN which thereby provides energy for operating the clock through closed front contact 183 and maintains a read-in relay RI energized through closed front contact 184 and a series circuit comprising a forward-polarized diode 182 and closed front contact 180 of relay DSD. Diodes 181 and 182 prevent undesired energization of relays PBR and RI, respectively, when energization is removed from one of these relays. Such undesired energization would otherwise be the result of an inductive pulse produced by the deenergized relay coil. In addition, diode 181 prevents undesired energization of relay RI when front contact 172 of relay PBR is closed and relay CSD is deenergized.

Each time relay RI is energized, front contact 185 closes, discharging a charged capacitor 186 through a minor aperture 142 of core 1C10, thereby setting the core. When relay RI again deenergizes, back contact 185 closes, again permitting capacitor 186 to acquire a charge from the positive side of the power supply. When core 1C2, 1C4, 1C6, 1C8 and 1C10 are cleared, outputs are taken from their respective minor apertures 121, 127, 132, 137 and 141 and applied to cores 1C1, 1C3, 1C5, 1C7 and 1C9 respectively, through their respective minor apertures 119, 125, 130, 135 and 140, provided apertures 121, 127, 132, 137 and 141 have been primed. This priming is accomplished through a back contact 187 and a current limiting resistor 160 upon deenergization of a relay CSDP. Relay CSDP deenergizes when relay CSD, coupled to minor aperture 123 of core 1C2 and minor aperture 120 of core 1C1, is deenergized, since front contact 189 is open, preventing relay CSDP from energizing. Thus, core 1C9 becomes set when a clock repeater relay CPA, coupled to front contact 176 of clock HC becomes energized. Upon energization, relay CPA closes a front contact 192, causing discharge of a charged capacitor 193 through the major aperture of cores 1C2, 1C4, 1C6, 1C8 and 1C10.

Cores 1C3, 1C5, 1C7 and 1C9 are coupled from their respective minor apertures 126, 131, 136 and 139 to minor apertures 122, 128, 133 and 138 of cores 1C2, 1C4, 1C6 and 1C8, respectively. Thus, since minor apertures 126, 131, 136 and 139 are primed through back contact 187 of relay CSDP, when relay CPA next deenergizes due to opening of front contact 176 of clock HC, back contact 192 of relay CPA closes, causing a charging current for capacitor 193 to pass through the major apertures of cores 1C3, 1C5, 1C7 and 1C9. This clears the cores, transferring their information respectively to cores 1C2, 1C4, 1C6 and 1C8. Additionally, the charging current for capacitor 193 clears core 1C1 through its major aperture. It should be noted that cores 1C2, 1C4, 1C6, 1C8 and 1C10 are at the same columnar level as cores 1C1, 1C3, 1C5, 1C7 and 1C9, respectively.

While relay HTN is energized, front contact 184 remains closed, so that each time relay DSD energized due to transfer of a set pulse from core 1D2 to core 1D1, front contact 180 of relay DSD closes, energizing relay RI and thereby applying a new set pulse to core 1C10 through minor aperture 142. In this fashion, each time clock HC energizes, and provided core 1D1 is set, relay RI energizes, setting core 1C10 immediately after it has been cleared by energization of relay CPA. This time sequence occurs because relay CPA is energized immediately upon energization of clock contact 176, while relay RI energizes shortly after closing of clock contact 177 due to the time delay involved in energizing relay CPB, which in turn must cause energization of relay DSD before relay RI can be energized. In this fashion, information originally stored in cores 1D1, 1D3, 1D5 and 1D7 is read out by shifting upwards in the D storage, being transferred serially from core 1D1 to core 1C10 in the C storage, and then being shifted upward in the C storage to fill the cores in ascending order until the leading bit of information arrives at core 1C2. This tag bit is always a binary ONE, since as previously explained, every push button, when depressed, sets core 1D1.

When core 1C2 is set, a relay CSD coupled thereto energizes, closing its front contact 189 and opening its back contacts 190 and 191. Back contact 191, upon opening, deenergizes relay HTN, halting operation of clock HC. Moreover, opening of back contact 190 removes stick circuit energy from relay PBR through closed front contact 172, causing the relay to deenergize. Closing of front contact 189 causes relay CSDP to energize. This closes front contact 187, thereby applying priming energy through current limiting resistor 160 to minor apertures 118, 124, 129 and 134 of cores 1C1, 1C3, 1C5 and 1C7, respectively, while minor apertures 121, 127, 132, 137 and 141 of cores 1C2, 1C4, 1C6, 1C8 and 1C10 remain primed. Simultaneously, a front contact 188 of relay CSDP closes. This causes discharge of a charged capacitor 199 through relay CPA closing front contact 192 which thereby causes transfer of information from cores 1C2, 1C4, 1C6, 1C8 and 1C10 to cores 1C1, 1C3, 1C5, 1C7 and 1C9, respectively. Relay CSD remains energized, however, since the binary ONE stored in core 1C2 is transferred to core 1C1, causing core 1C1 to become set. However, when capacitor 199 has fully discharged through relay CPA, back contact 192 closes, causing parallel transfer of information from primed minor apertures 118, 124, 129 and 134 of cores 1C1, 1C3, 1C5 and 1C7, respectively, to cores 1B1, 1B2, 1B3 and 1B4 respectively, of the B storage. The coded signal from the cores of the C storage is applied to the cores of the B storage by coupling each bit of the signal around the leg of a separate core located between the major aperture and output minor aperture of the core, the output minor aperture of each core in the B storage being that designated 143, 145, 146 and 147 of cores 1B1, 1B2, 1B3, and 1B4, respectively. Thus, any signal produced at the output of any of the C cores sets the respective B cores to which it is coupled. This type of setting, commonly known as holdless coupling, prevents back transfer of pulses to the C cores when the B cores are cleared.

It should be noted that the lowermost cores of the aforementioned D, C and B storages are coupled to the upper cores of the storages by conductors shown dotted. This is to illustrate the fact that each column may comprise any number of cores.

When the code is stored in the B storage, the tag bit applied thereto sets core 1B1, thereby energizing a relay BSD, coupled thereto, with radio frequency energy in a manner similar to that described for energization of relay DSD. Simultaneously, relay CSD deenergizes, thereby conditioning the system to permit the C storage to accept a new code from the D storage. Moreover, front contact 189 is opened, deenergizing relay CSDP.

Energization of relay BSD closes front contact 194, energizing a relay BSDP and passing the energization current through minor apertures 143, 145, 146 and 147 of the B storage cores, thereby priming those cores of the B storage which are set. After a brief but finite interval, back contact 195 of relay BSDP opens, assuring that relay CSDP cannot be energized under these circumstances. Moreover, back contact 196 of relay BSDP opens and front contact 196 closes, thereby discharging a charged capacitor 197 through the major apertures of the B storage cores, clearing the cores. Outputs from minor apertures 143, 145, 146 and 147 of cores 1B1, 1B2, 1B3 and 1B4, are coupled to the respective A storage cores 1A1, 1A2, 1A3 and 1A4 through their respective minor apertures 151, 154, 157 and 158. Outputs of the B storage are brought out to junctions J3–J10, and inputs to the A storage are applied to junctions J3′–J10′. Moreover, radio frequency energy is supplied to the A storage at a junction J1′ and returned from the A storage at a junction J2′. Thus, radio frequency energy is applied to the A storage by coupling junction J1′ to a junction J1 which in turn is coupled to one side of the radio frequency generator, and by coupling junction J2′ to a junction J2 which in turn is coupled to the other side of the radio frequency generator. Junctions J3–J10 are coupled to correspondingly numbered junctions J3′–J10′, in order to complete the circuit between the B and A storage.

When the code stored in the B storage reaches the A storage, the tag bit sets core 1A1, thereby energizing a relay 1ASD in a fashion similar to that explained for relay BSD. Relay 1ASD then closes a front contact 198, which energizes a relay 1ASDP having associated therewith contacts 161–164.

Energization of relay 1ASDP opens back contact 163 which is connected in series with front contact 196 of relay BSDP through coupled junctions J13 and J13′, and is also coupled through the major apertures of the B storage cores through coupled junctions J14 and J14′. Clearing of the B storage cores in the event another code is applied to the B storage while a code is stored in the A storage is thereby prevented.

Clearing of the B storage deenergizes relay BSDP, removing the prime signal from minor apertures 143, 145, 146 and 147 of the B storage cores. Back contact 195 is thereby closed, permitting reenergization of relay CSDP by energization of relay CSD; furthermore, back contact 196 is closed, permitting capacitor 197 to acquire a new charge. It should be noted that if a first code is stored in the A storage and a second code is stored in the B storage, both front contacts 196 (see FIG. 3A) and 163 (see FIG. 3B) are closed, thereby permitting capacitor 197 to remain charged from the positive source of potential. Then when the code is transferred out of the A storage, back contact 163 closes, clearing the B storage as previously explained.

Front contact 164 of relay 1ASDP, upon closing, applies a small amplitude priming-type current through input minor apertures 151, 154, 157 and 158 of respective cores 1A1, 1A2, 1A3 and 1A4, through a series-connected resistor 200 which limits the priming type current amplitude. This current slowly reverses flux direction around the input minor apertures of the A storage cores, thereby preventing transmittal of undesired back pulses to the output minor apertures of the B storage cores when the A storage cores are cleared.

A relay 1ACS is energized with radio frequency energy from an output minor aperture 159 of core 1A4, in a manner similar to that described for energization of relay DSD. The information provided by the bit contained in core 1A4 determines whether track switch TS1, is to be thrown to the left or the right. It is here assumed that normal switch direction is to the left and reverse switch direction is to the right. A pair of switch control relays 1NWR and 1RWR are provided. Energization of relay 1NWR throws the track switch to the left, while energization of relay 1RWR throws the track switch to the right. A pair of contacts 165 and 166 are provided on relay 1ACS. Contact 165 controls the direction in which the track switch is to be thrown while contact 166 controls direction of signal transfer through the circuit.

A track repeater relay 1TP having a pair of contacts 167 and 168 is energized so long as the detector track section associated with track switch TS1 remains unshunted by a cut. As soon as the track section is shunted, relay 1TP deenergizes, and remains deenergized until the cut leaves the detector track section. Such circuits are well known in the art. Contacts 167 and 161 are connected in series between the source of positive potential and the heel of contact 165. Front contact 165 is coupled to relay 1NWR while back contact 165 is coupled to relay 1RWR. Therefore, as long as the detector track section is unshunted and a code is stored in the A storage, contacts 167 and 161 are closed, energizing the heel of contact 165. Under these conditions, depending upon whether relay 1ACS is energized or deenergized, track switch TS1 is thrown either to the left or the right because of energization of either relay 1NWR or relay 1RWR.

A pair of track switch TS1 repeater relays 1RWP and 1NWP are provided for the purpose of supplying feedback information to the circuit pertaining to the direction in which track switch TS1 is thrown. A contact 220 is operated by relay 1RWP, while a contact 221 is operated by relay 1NWP. Circuits for operation of track switch repeater relays are well known in the art.

When a cut enters the detector track section, relay 1TP deenergizes, preventing further switching of track switch TS1 by deenergizing the circuits to relays 1NWR and 1RWR. Simultaneously, back contact 168 of relay 1TP closes, applying positive potential through closed front contact 162 to the heel of contact 166. Depending upon the condition of energization of relay 1ACS, either front or back contact 166 is closed. Furthermore, depending upon the position of track switch TS1, either front contact 220 or front contact 221 is closed. Contact 220 is connected in series with back contact 166, while contact 221 is connected in series with front contact 166. Front contact 220 controls priming of output minor apertures 149, 153 and 156 of respective cores 1A1, 1A2, and 1A3, thereby controlling transfer of information to the right, while front contact 221 controls priming of output minor apertures 148, 152 and 155 of the respective A storage cores, thereby controlling transfer of output information to the left. Therefore, contact 166 is positioned in accordance with the direction of track switch TS1 called for by the circuit, while contacts 220 and 221 are positioned in accordance with the actual position of the track switch. If the called-for and actual positions of the track switch coincide, either the output minor apertures of the A storage cores for transfer to the left are primed, or the output minor apertures of the A storage cores for transfer to the right are primed, as the case may be. However, if the position of the track switch does not coincide with the position called-for, neither priming circuit for the output minor apertures of the A storage core is energized. When the cut leaves the detector track section, relay 1TP again becomes energized, opening back contact 168.

As illustrated in FIG. 3D, information from the A storage of the track switch storage means is transferred to a subsequent A storage. It will be recognized by those skilled in the art that this subsequent storage need not be an A storage, but may be a B, C or D storage, depending upon the distance between track switches in the car classification yard. However, for simplicity of illustration, it is assumed that the distance between track switches is sufficiently slight to warrant transfer of information from a preceding A storage to a succeeding A storage.

Transfer of information from track switch storage 1 to track switch storage 3 occurs in the following manner. Assume a cut has entered the detector track section for track switch TS1. This causes deenergization of relay 1TP, closing back contact 168 as previously explained, and energizing the upper coil of a dual coil transfer call relay 1TNC having contacts 230, 231, 232, 233 and 237. Contact 232 energizes the lower coil of relay 1TNC, causing the relay to stick. Front contact 230, upon closing, energizes the upper coil of a transfer relay 1TN from a common return lead for the priming circuits of cores 1A1, 1A2 and 1A3. Relay 1TN has associated therewith contacts 234, 235 and 236. Upon energization of relay 1TN, back contact 234 opens, thereby removing energy from the upper coil of relay 1TNC supplied from back contact 168 of relay 1TP. Moreover, back contact 235 of relay 1TN opens, thereby removing energy from the stick circuit for the lower coil of relay 1TNC through front contact 232. Simultaneously, front contact 236 closes prior to dropping away of relay 1TNC. A circuit is thus completed through the major apertures of the A storage cores in series with front contacts 233 and 236, to a charged capacitor 169. The capacitor then discharges through the major apertures of the A storage cores, clearing the cores and causing transfer of information either to the left or the right depending upon which of the output minor apertures of the A storage cores are primed.

It should be noted that upon energization of relay 1TNC, and thus immediately prior to discharge of capacitor 169 through the major apertures of the A storage cores, back contact 237 of relay 1TNC opens, removing priming energy from the input minor apertures of the A storage cores for track switch TS1. This permits proper operation of core 1A1 by avoiding a situation where two prime signals and a radio frequency drive signal are simultaneously applied to a single core. Reinforcement of fluxes in a single core due to three priming signals occurring simultaneously may cause the remanent magnetic state of the core to switch to some undesired condition.

With relay 1TNC deenergized, once the cut leaves the detector track section for track switch TS1, relay 1TP again energizes, opening back contact 168. This removes stick circuit energy previously applied to the lower half coil of relay 1TN through front contact 234, deenergizing the relay. This causes back contact 236 to close, permitting capacitor 169 to again acquire a charge in preparation for the reception of a new code in the A storage for track switch TS1.

Means are provided for cancelling the code stored in the A storage for track switch TS1 from a push button 1CN. This push button, upon being depressed, energizes the upper coils of relays 1TNC and 1TN. The upper coil of relay 1TNC is energized through a series-connected diode 238, while the upper coil of relay 1TN is energized through a series-connected diode 239. The diodes prevent transfer of energy between relays 1TNC and 1TN when one or the other relay has its state of energization changed. Energization of these relays, which occurs simultaneously when push button 1CN is depressed, causes discharge of capacitor 169 through the major apertures of cores 1A1–1A4, clearing the cores. If this cancellation is performed while the detector track section is unoccupied, back contact 168 of track repeater relay 1TP is open, preventing priming of any output minor apertures in cores 1A1, 1A2 and 1A3. Thus, when these cores are cleared, the code in this instance is destroyed, rather than transferred.

Several automatic code cancelling features are built into the A storage. One of these provides automatic code cancellation when track switch TS1 is out of correspondence with the position called-for by relay 1ACS. This condition may result when the track switch is unable to move because of obstructions, or when the maintainer has turned switch energy off. It can also occur when other personnel in the yard have taken over manual control of the track switch. In such event, the position of contact 166 is out of correspondence with the positions of contacts 220 and 221, so that cores 1A1, 1A2 and 1A3 are not primed. However, the upper coil of relay 1TN is energized through front contact 230 after back contact 168 of track repeater relay 1TP closes due to presence of a cut on the detector track section. Thus, capacitor 169 discharges through front contacts 233 and 236, and through the major apertures of cores 1A1–1A4. This clears the A storage cores, destroying the code storage therein.

Automatic code cancellation is also effected when the code in the A storage for track switch TS1 cannot be transferred ahead because the storage for the track switch immediataly ahead is full. In this instance, as a cut enters the detector track circuit, deenergizing relay 1TP which closes back contact 168, relay 1TNC is energized. Priming of the output minor apertures of the A storage cores cannot take place until the storage ahead clears. If the storage ahead does not clear, relay 1TN cannot be energized, preventing relay 1TNC from deenergizing. In the event the cut leaves the detector track before transfer of the code to the storage ahead has taken place, the aforementioned output minor apertures are not primed. Relay 1TN is then energized through front contact 168 of relay 1TP and front contact 231 of relay 1TNC. Capacitor 169 is thus discharged through front contatcs 236 and 233, through the major apertures of cores 1A1–1A4, clearing the cores. Since the output minor apertures in these cores are not primed, the code stored in the A storage is destroyed, rather than transferred to a subsequent storage means.

If track switch TS1 is in correspondence with the position called for by the code in the A storage associated with the track switch, and if the storage ahead is clear, the code transfers to the storage ahead. Assume the transfer takes place to the A storage for controlling track switch TS3; that is, transfer in the switch reverse direction, or to the right. The code is thus transferred from primed minor apertures 149, 153 and 156 of cores 1A1, 1A2 and 1A3, to input minor apertures 201, 205 and 208 of cores 3A1, 3A2 and 3A3, respectively, of the A storage for track switch TS3. The tag bit is thus transferred to core 3A1, setting the core and thereby energizing a relay 3ASD coupled to minor aperture 204 of core 3A1 with radio frequency energy in a manner similar to that described for relay DSD. Moreover, relays 1ASD and 1ACS are deenergized. Deenergization of relay 1ASD serves to deenergize relay 1ASDP also.

Energization of relay 3ASD causes its front contact 240 to close, thereby energizing a relay 3ASDP. This relay in turn closes its front contacts 241, 242 and 243, and opens its back contact 244. Opening of back contact 244 assures that priming energy is removed from minor apertures 149, 153 and 156 of cores 1A1, 1A2 and 1A3, respectively by breaking the connection between the front contact 220 of relay 1RWP and the priming circuit for minor apertures 149, 153 and 156, since back contact 244 is connected in series therewith. However, priming energy should already be removed from these minor apertures by opening of front contact 162 of relay 1ASDP. Moreover, it should be noted that since the code has not been transferred to the left, the priming circuit for minor apertures 148, 152 and 155 of the A cores is still intact, and thus transfer can be accomplished to the left provided the storage for track switch 2 remains clear, even though the storage for track switch 3 is full.

If the code were transferred to the left from output minor apertures 148, 152 and 155 of cores 1A1, 1A2 and 1A3, the tag bit, upon arriving at the uppermost core in the A storage for track switch TS2, would assure opening of the priming circuit for minor apertures 148, 152 and 155 by opening a back contact 253 connected in series therewith. Again however, priming energy should already be removed from these minor apertures by opening of front contact 162 of relay 1ASDP.

Closing of front contact 241 causes application of a prime signal through minor apertures 201, 205 and 208 of cores 3A1, 3A2 and 3A3, respectively. This prime current is applied through a series-connected resistor 244 which serves to limit prime current amplitude in a manner similar to that achieved by resistor 200 coupled to the A storage for track switch TS1, and for the same purpose; namely, to prevent back transfer of pulses from the cores upon application of a clear pulse through the major apertures of the cores.

The lowermost core in the A storage for track switch TS3, namely, core 3A3, has coupled thereto a relay 3ACS through minor aperture 209. This relay is energized by radio frequency energy which is also coupled through minor aperture 209 in the same fashion as relay 1ACS coupled to core 1A4 of the A storage for track switch TS1. Energization of this relay is dependent upon the information bit stored in core 3A3, and controls the direction of information transfer from cores 3A1 and 3A2. The relay has associated therewith a pair of contacts 246 and 247. Back contact 246 is coupled to a switch control relay 3RWR for throwing track switch TS3 to the right, while front contact 246 is coupled to a track switch control relay 3NWR for throwing track switch TS3 to the left. These track switch control relays position track switch TS3 in the same manner that relays 1NWR and 1RWR position track switch TS1. A track repeater relay 3TP responsive to the condition of the detector track section associated with track switch TS3 is also provided. This track repeater relay has a pair of contacts 248 and 249 associated therewith. The heel of each of these contacts is connected to the source of positive potential. Front contact 248 is coupled to the heel of contact 243, while back contact 249 is coupled to the heels of contacts 242 and 334. The heel of contact 246 is coupled to front contact 243, while the heel of contact 247 is coupled to front contact 242. Thus, when a code is applied to the A storage for track switch TS3, front contacts 242 and 243 are closed, due to presence of the tag bit in core 3A1. If the detector track section associated with track switch TS3 is unoccupied, front contact 248 is closed and energy is applied to the heel of contact 246, such that if relay 3ACS is energized, relay 3NWR is energized through front contact 246, while if relay 3ACS is deenergized, relay 3RWR is energized through back contact 246. On the other hand, if a cut shunts the detector track section, contact 246 recevies no energy while the heel of contact 247 receives energy through front contact 242.

A pair of track switch reperater relays 3RWP and 3NWP are provided in order to supply indications of the condition of track switch TS3 in the same manner that relays 1RWP and 1NWP provide information as to the position of track switch TS1. Relay 3RWP has associated therewith a contact 250 and relay 3NWP has associated therewith a contact 251. Front contact 250 is coupled to output minor apertures 203 and 207 of cores 3A1 and 3A2, respectively, and provides priming energy for transfer of the signal to the right. Similarly, front contact 251 is coupled through output minor apertures 202 and 206 of cores 3A1 and 3A2, and provides priming energy for transfer of the signal to the left. Thus, if relay 3ACS is deenergized, back contacts 246 and 247 are closed. Back contact 246 energizes relay 3RWR, which then positions track switch TS3 to the right or reverse, position. When the track switch positions itself to the right, relay 3RWP becomes energized. This closes front contact 250, which applies priming current to minor apertures 203 and 207 of cores 3A1 and 3A2, respectively.

When a cut enters the detector track section associated with track switch TS3, relay 3TP deenergizes, opening its front contact 248 and closing its back contact 249. Opening of front contact 248 prevents further energization of relays 3RWR and 3NWR since it opens the circuits to the heel of contact 246. However, back contact 249 provides voltage to the heel of contact 247 such that priming current now flows through minor apertures 203 and 207. Moreover, back contact 249 also provides energization to the upper coil of a two-coil transfer call relay 3TNC. This relay has asociated therewith contacts 330, 331, 332, 333 and 337.

Upon energization of relay 3TNC, front contact 330 closes, thereby energizing the upper coil of a two-coil transfer relay 3TN having associated therewith contacts 334, 335 and 336. Relay 3TN then energizes, causing discharge of a capacitor 252 through closed front contacts 333 and 336 connected in series, through the major apertures of cores 3A1, 3A2 and 3A3. This clears cores 3A1 and 3A2, causing transfer of the code stored therein from their respective primed minor apertures 203 and 207 to a pair of cores 7A1 and 7A2 comprising an A storage for track switch TS7 through their respective input minor apertures 301 and 303. Simultaneously with closing of front contact 336, back contact 335 opens, removing stick circuit energy from relay 3TNC applied to the lower coil through closed front contact 332. Also, back contact 334 opens, removing energization from the upper coil of relay 3TNC, causing dropaway of relay 3TNC which opens front contacts 330 and 331. However, prior to dropaway of relay 3TNC, front contact 334 closes, thereby applying stick circuit energy to the lower coil of relay 3TN. It should be noted that energization of relay 3TNC also causes opening of back contact 337, thereby removing the prime signal from respective minor apertures 201, 205 and 208 of cores 3A1, 3A2 and 3A3 prior to applying output prime current to cores. The reason for this operation is to avoid undesired switching of cores 3A1, 3A2 and 3A3 due to simultaneous presence of an excessive number of priming signals on the core, as explained in conjunction with core 1A1.

Upon transfer of information from the A storage for track switch TS3, relays 3ASD and 3ACS deenergize. Deenergization of relay 3ASD serves to deenergize relay 3ASDP, thereby closing back contact 244, permitting priming of minor apertures 149, 153 and 156 of cores 1A1, 1A2 and 1A3, again permitting transfer of information from the A storage for track switch TS1, to the right. Moreover, energization is removed from the heels of contacts 246 and 247 by opening of front contacts 243 and 242, thereby preventing priming of output minor apertures 202 and 203 of core 2A1 and 206 and 207 of core 3A2.

When the cut leaves the detector track section associated with track switch TS3, track repeater relay 3TP again energizes, closing front contacts 248 and 249. Since back contact 249 is now open, the lower coil of transfer relay 3TN no longer receives energization through its stick circuit comprising front contact 334. Thus, relay 3TN deenergizes. Capacitor 252 again acquires a charge, since if either back contact 333 or 336 is closed, the capacitor is connected across the D.C. voltage source.

Both manual and automatic cancellation means are provided for cancellation of the code stored in the A storage for track switch TS3. Manual cancellation is achieved by depression of a push buttom 3CN, whcih applies a source of positive voltage to the upper coils of both relays 3TN and 3TNC, thereby connecting front contacts 333 and 336 in series with charged capacitor 252, causthe capacitor to discharge through the mapor apertures of the A storage cores for track switch TS3. If this push buttom is depressed during the interval in which no cut is present on the detector track section associated with track switch TS3, relay 3TP is energized and back contact 249 is open. This prevents entrgization of the heel of contact 247, preventing priming energy from being applied to any of the output minor apertures in the A storage cores for track switch TS3. Under these circumstances, the code stored in the A storage for track switch TS3 is cancelled, rather than transferred forward. It should be noted that energization for the upper coils of relays 3TNC and 3TN, applied when push buttom 3CN is depressed, is coupled thereto through a pair of diodes 338 and 339 respectively. These diodes perform functions identical to diodes 238 and 239.

Automatic code cancellation is provided for the cores of the A storage controlling track switch TS3 in a manner similar to the automatic code cancellation provided for tht A storage controlling operation of track switch TS1. The code stored in the A storage for track switch TS3 is therefore automatically cancelled whenever track switch TS3 is out of correspondence with relay 3ACS, since relays 3TN and 3TNC are both energized at a time when minor apertures 202, 203, 206 and 207 of cores 3A1 and 3A2 are not primed. Automatic cancellation also occurs when the code in the A storage for track switch TS3 cannot be transferred ahead because the next storage is full. Again in such case, relays 3TN and 3TNC are energized, discharging capacitor 252 through the major apertures of cores 3A1, 3A2 and 3A3 when the A storage for the next called-for switch is full.

With the code now stored in the A storage for track switch TS7, which for simplicity is illustratd as comprising the entire storage means for the track switch, the final portion fo the code is stored in cores 7A1 and 7A2. As with the A storage for track switch TS1, the bit stored in the lowermost core of the A storage for track switch TS3 is not transferred forward, since it was previously utilized in controlling energization of relay 3ACS, which in turn controlled the transfer of the code from the A storage for track switch TS3 to the right or the left.

Presence of the code in the A storage for track switch TS7 causes energization of a relay 7ASD coupled to output minor aperture 302 of core 7A1, since as previously explained, the tag bit is transferred to the uppermost core in the storage. Since the tag bit is always a binary ONE, core 7A1 is set, and relay 7ASD is energized with radio frequency energy in a manner similar to that explained for relay DSD. This relay closes its front contact 340, thereby energizing a relay 7ASDP having associated therewith contacts 341, 342 and 343. A relay 7ACS is coupled to output minor aperture 304 of core 7A2 in a manner similar to that described for relay 1ACS, and is energized with radio frequency energy when core 7A2 is set. This relay controls the direction in which track switch TS7 is thrown. Thus, when relay 7ACS is energized, its associated front contact 344 is closed. If the detector track section associated with track switch TS7 is unshunted by a cut, a track repeater relay 7TP is energized, maintaining its front contact 345 closed. The heel of contact 345 is connected to a source of positive energy, while front contacts 345 and 342 are connected in series with the heel of contact 344. Thus, upon energization of relay 7ACS, front contact 344 which is coupled to normal switch control relay 7NWR for track switch TS7 applies energy to relay 7NWR, thereby causing track switch TS7 to be thrown to the left. On the other hand, if relay 7ACS is deenergized due to core 7A2 not being set, back contact 344 will be closed. Since back contact 344 is coupled to reverse switch control relay 7RWR for track switch TS7, relay 7RWR is energized, causing track switch TS7 to be thrown to the right.

Energization of relay 7ASDP, indicating that the storage for track switch TS7 is full becouse of presence of the tag bit, causes back contact 343 to open. This contact is connected in series with output minor apertures 203 and 207 of cores 3A1 and 3A2 respectively, controlling transfer of a code stored in the A storage for track switch TS3 to the right. Thus, in the event transfer of a code stored in the A storage of track switch TS3 is called for, contact 343, being open, prevents such transfer, causing destruction of the code stored in the storage means for track switch TS3. On the other hand, if transfer of a code stored in the storage means for track switch TS3 is called for to the left, and if the storage means for track switch TS6 has no code stored therein, transfer can be accomplished to the left; however, in the event a code is stored in the A storage for track switch TS6, a back contact 346 connected in series with the priming means for output minor apertures 202 and 206 of cores 3A1 and 3A2, respectively, will be open, thereby preventing such transfer in a fashion similar to that prevented by back contact 343. It should also be noted that a resistor 347 is provided in series with front contact 341 and input minor apertures 301 and 303 of cores 7A1 and 7A2, respectively. This resistor provides the same function for the cores of the A storage for track switch TS7 as does resistor 200 for the cores of the A storage for track switch TS1; namely, to limit the amount of current coupled through input minor apertures 301 and 303, enabling a gradual switching of the flux around these minor apertures so as to prevent back transfer of pulses when the cores in this storage are cleared, without producing back pulses at the instant front contact 341 is closed.

When the cut enters the detector track section associated with track switch TS7, track repeater relay 7TP deenergizes, opening its front contact 345 which thereby prevents energization of relays 7RWR and 7NWR, in turn preventing accidental operation of the track switch while a cut is present on the detector track section, and closing back contact 345 which provides energization to the upper coil of a double coil relay 7TN. A capacitor 347 is coupled to the heel of a contact 348 of relay 7TN. While relay 7TN is deenergized, back contact 348, which is coupled to the source of positive potential, causes capacitor 347 to acquire a charge. However, when relay 7TN is energized, back contact 348 opens and front contact 348 closes. Front contact 348 is coupled through the major apertures of cores 7A1 and 7A2 to the negative side of the energy source. Thus, closing of front contact 348 causes discharge of capacitor 347 through the major apertures of cores 7A1 and 7A2, clearing the cores.

A cancellation push button 7CN is coupled to the lower coil of relay 7TN in reversed current direction. Depression of this push button also energizes relay 7TN, so that as long as the detector track section for track switch TS7 is unoccupied, back contact 345 is open, capacitor 347 remains charged, and depression of push button 7CN causes discharge of capacitor 347 through the major apertures of cores 7A1 and 7A2, thereby destroying the code stored therein. If on the other hand, a cut occupies the detector track section when the code for a following cut is transferred into the A storage for track switch TS7, manual cancellation again may be desired. If the operator presses push button 7CN, relay 7TN which is energized through back contact 345 of relay 7TP drops away, due to flow of opposing current through the lower coil of relay 7TN. This causes capacitor 347 to charge. When push button 7CN is thereafter released, relay 7TN is again picked up, causing discharge of capacitor 347 through the major apertures of cores 7A1 and 7A2, thereby destroying the code for the following cut formerly stored therein, even though the detector track section remains occupied by the preceding cut.

Operation of the circuit shown in FIGS. 3A–3D for transfer of a code from the push buttons to the final track switch is as follows. Assume it is desired to send a cut to track T7 as shown in FIG. 1B. Push button 7PB is therefore depressed. If no code is stored in the C storage, relay CSD is deenergized. Moreover, assuming no code is in the D storage prior to depression of push button 7PB, relay DSD is deenergized. Thus, relay PBR is deenergized and capacitor 170 is fully discharged. Depression of push button 7PB causes current to flow through minor apertures 101, 106, 111 and 116 of cores 1D1, 1D3, 1D5 and 1D7, respectively. Current flow is returned to capacitor 170 through the major apertures of cores 1D3 and 1D1. Thus, current is magnetically coupled around the leg of core 1D3 between minor aperture 111 and the major aperture, and around the leg of core 1D1 between minor aperture 101 and the major aperture, setting these cores. Cores 1D5 and 1D7 remain clear.

The form of setting is illustrated in FIGS. 4A and 4B. In FIG. 4A, current flow through the major aperture of a core 42 is shown by the direction of an arrow on conductor 40 passing through the major aperture. The current through conductor 40 clears the core, setting up flux paths in the core around minor apertures 43 and 44 as shown by the arrows in the core. In FIG. 4B, current through conductor 41 in the direction shown by the arrow on the conductor threads minor aperture 43 and the major aperture of core 42. This has the effect of switching the direction of flux in the portion of the core around the outside of the major aperture extending outward from the major aperture as far as the minor aperture. Thus, core 42 is set. This type of setting is well-known in the art.

Returning to FIGS. 3A–3D, when core 1D1 is set, relay DSD energizes, closing its front contact 180. This energizes relay PBR, closing front contact 171 and thereby locking out the push buttons. This is achieved by retaining a charge on capacitor 170 such that in the event another push button is depressed during the interval in which the capacitor is charged, the capacitor cannot be discharged because the positively charged plate is coupled through cores 1D1, 1D3, 1D5 and 1D7 to a positive voltage source. Moreover, front contact 173 energizes relay HTN, which then starts clock HC, alternately opening and closing front contacts 176 and 177. Relay HTN also closes its front contact 184, thereby completing a circuit to read-in relay RI. This relay then sets the lowermost core in the C storage by discharging capacitor 186 through front contact 185 and through the input minor aperture of core 1C10.

When the circuit to clock HC is completed, front contacts 176 and 177 begin to alternately open and close. As long as relay CSDP is deenergized, the cores of the C storage are primed through back contact 187 to facilitate serial transfer of information from the D storage to the C storage. The D storage is permanently primed to facilitate serial transfer.

When relays CPA and CPB energize for the first time, they discharge capacitors 193 and 179 respectively through the major apertures of the left column of cores in the C and D storages respectively, which in turn transfer the information stored therein from the left column of cores to the right column of cores in their respective storages. Relay DSD then deenergizes, since core DSD is cleared. This opens front contact 180 deenergizing relay RI, thereby permitting capacitor 186 to accquire a charge through back contact 185.

When relays CPA and CPB deenergize during the second half of the first clock cycle, capacitors 193 and 179 respectively now acquire a charge through the major apertures of the cores in the right column of the C and D storages respectively, transferring the code from the right column of cores to the left column of cores although diagonally upward as dictated by the priming current through minor apertures 104, 109 and 114 of cores 1D2, 1D4 and 1D6 respectively, and by the priming current from back contact 187 applied to cores 1C3, 1C5, 1C7 and 1C9. Hence, in one clock cycle, the code shifts upward one core in the D and C storages. When originally the code for track T7 was established in the D storage, core 1D3 was not set. Since the unset state of core 1D3 has now been transferred to core 1D1, relay DSD remains deenergized, and therefore core 1C10, the lowest core in the C storage, is not set, as is now dictated by the original unset condition of core 1D3.

Relay PBR does not follow relay DSD since relay PBR is stuck by relay CSD once relay PBR has been energized. The serial transfer operation from the D storage to the C storage continues until the ONE which originally set core 1D1 has been serially transferred into core 1C2. This condition is sensed by relay CSD, which energizes, deenergizing relay HTN and thereby stopping clock HC, causing the track T7 code to remain at rest in the left column of cores in the C storage. Moreover, when relay CSD energizes, relay PBR deenergizes, thereby activating the track code push buttons by discharging capacitor 170 through the front contacts of the push buttons. Thus, a new code can now be applied to the D storage. However, this new code cannot be transferred into the C storage because relay CSD is energized, retaining relay HTN in the deenergized condition and thereby preventing clock HC from operating.

Serial transfer is advantageously utilized between the D and C storages since they are often separated from each other by great distances in present-day car classification yards. Serial transfer requires a minimum number of wires and relays between the two storages, as opposed to parallel transfer.

The code stored in the C storage is transferred into the B storage if the B storage is empty. This transfer occurs since relay CSDP energizes when relay BSDP is deenergized, indicating that the B storage is empty. As the CSDP relay energizes, it removes the serial prime signal from minor apertures 126, 131, 136 and 139 of cores 1C3, 1C5, 1C7 and 1C9 and now primes minor apertures 118, 124, 129 and 134 of the respective C storage cores. Energization of relay CSDP also causes discharge of charged capacitor 199 through front contact 188, energizing relay CPA and in turn causing discharge of charged capacitor 193 through the major apertures of the left column of cores in the C storage. The code stored in the left column of cores in the C storage is thus transferred into the right column of cores in the C storage. After capacitor 199 discharges, relay CPA again deenergizes, and capacitor 193 acquires a charge through the major apertures of the right column of cores in the C storage. The charging current for this capacitor clears the right column of cores in the C storage, thereby transferring the code stored therein, in parallel mode, to the B storage. When the code is transferred out of both columns of C storage cores, relays CSD and CSDP deenergize, allowing a new code to be transferred into the C storage.

With the code now stored in the B storage, core 1B1 is set, in turn energizing relay BSD which primes the output minor apertures of the B storage cores, using the coil resistance of relay BSDP as a current limiting resistor for this priming circuit. A finite time interval, such as 25 milliseconds, is required to pick up relay BSDP. The circuit is so designed however, that the output minor apertures of the B cores are fully primed within this time interval. When relay BSDP is picked up, charged capacitor 197 is discharged through the major apertures of the B storage cores. However, this discharge occurs only if no code is stored in the A storage for track switch TS1, since the discharge circuit for capacitor 197 is qualified by the condition of relay 1ASD.

Discharge of capacitor 197 through the major apertures of the B storage cores causes transfer of the code to the A storage cores for track switch TS1. Core 1A1 thus becomes set, causing energization of relays 1ASD and 1ASDP. Energization of relay 1ASDP cause priming out of the magnetic flux in the portion of each A storage core threaded by the input set current. At the same time, relay 1ACS is deenergized, since the track code is such as to not set core 1A4, as is the case for the code designating track T7. Deenergization of relay 1ACS causes energization of reverse switch control relay 1RWR, throwing track switch TS1 to the reverse position.

When the cut that has been assigned the code presently stored in the A storage for track switch TS1 enters the detector track circuit at this switch, relay 1TP deenergizes, energizing transfer call relay 1TNC and also checking switch correspondence through back contact 166 of relay 1ACS and front contact 220 of relay 1RWP. Energization of relay 1TNC opens back contact 237, removing the input prime signal coupled through minor apertures 151, 154, 157 and 158 of cores 1A1, 1A2, 1A3 and 1A4, respectively. The circuit for checking switch correspondence also checks that relay 3ASD of the following storage to which the code will be transferred is deenergized. If relay 3ASDP is deenergized, back contact 244 is closed, permitting priming current to be coupled through the right output apertures 149, 153 and 156 of cores 1A1, 1A2 and 1A3, respectively, and from there to provide energization for transfer relay 1TN through front contact 230 of relay 1TNC. Relay 1TN acts as a priming circuit current limiting resistance for the output minor apertures of the cores in the A storage for track switch TS1. When relay 1TN is energized, it causes discharge of capacitor 169 through the major apertures of the A storage for track switch TS1. As a result, the code in the A storage for track switch TS1 is transferred to the right as dictated by the priming current through output minor apertures 149, 153 and 156 of cores 1A1, 1A2 and 1A3, respectively. Once relay 1TN is energized, it sticks through its front contact 234, and by opening back contact 234 deenergizes relay 1TNC.

In the transfer from the A storage for track switch TS1 it should be noted that information stored in core 1A4 is not transferred ahead, but instead is dropped. This is because the portion of the code stored in core 1A4 was used to control track switch TS1. It therefore is not needed beyond the A storage for track switch TS1. At the next successive track switch, information stored in core 1A3 is used to control the successive switch. This information also is dropped after this next successive switch has been thrown.

It should be noted that the code is transferred out of the A storage for track switch TS1, even though the cut using this code still occupies the detector track associated with track switch TS1. A new code can now be transferred into the A storage for track switch TS1. However, only relays 1ASD and 1ACS can react to this new code, since with track repeater relay 1TP deenergized, the track switch cannot assume a new position. This provides protection for the cut on the detector track circuit. Moreover, with relay 1TNC held in the deenergized position due to relay 1TN being stuck in the energized position, the cores in the A storage for track switch TS1 can neither be driven, nor can they be advance primed through their output minor apertures. However, as soon as the cut leaves the detector track circuit, relay 1TP again energizes, permitting track switch TS1 to position itself in accordance with the new code. Moreover, energization of relay 1TP also deenergizes relay 1TN.

It is now obvious that an entire automatic switching system can be built up from the four different types of storages known as the A, B, C and D storages. FIGS. 3A–3D illustrate a simplified version of a circuit for controlling a typical car classification yard, since, with the code for track T7 having been applied to the D storage, transfer of the code takes place from the A storage for track switch TS1, to the A storage for track switch TS3, and thence to the A storage for track switch TS7. The transfer which takes place from the A storage for track switch TS3 to the A storage for track switch TS7 occurs in a manner similar to the transfer of the code from the A storage for track switch TS1 to the A storage for track switch TS3. It is to be understood that in a typical classification yard, not only might there be additional B, C and D storages utilized, but as the number of destination tracks in the yard is increased, additional cores are required in each storage, in order to accommodate the additional necessary code bits. Moreover, information in addition to route information can be transferred along with each cut simply by adding cores to each column in order to accommodate code bits comprising the information.

Turning now to FIG. 5, there is shown a modification of the A storage of track switch TS1. In this version of the A storage, the input priming current to minor apertures 151, 154, 157 and 158 of cores 1A1, 1A2, 1A3 and 1A4, respectively, is not turned off. Contact 164 of relay 1ASDP and resistor 200 are not used. Instead, the energization current of relay 1ASDP is utilized for priming the aforementioned minor apertures. The coil of relay 1ASDP serves as a priming inductance and dropping resistance. In order to cancel the effect of the input prime current to the input minor apertures of the aforementioned cores when the advance prime current is turned on, preparatory to advancement of the code to the next A storage, the common conductor for the advance prime winding through minor apertures 148, 152 and 155 and the advance prime winding through minor apertures 149, 153 and 156, of respective cores 1A1, 1A2, and 1A3, is coupled through input minor apertures 151, 154, 157 and 158, but in a direction in opposition to the input prime current, and thence is passed through front contact 230 of relay 1TNC in order to energize relay 1TN. As a result, the effect of one of the two simultaneous prime currents through any given core in the A storage for track switch TS1 is cancelled out by magnetic flux cancellation. A circuit of this type, which decreases the number of prime currents passing through any given core, may be utilized in place of any of the A storages provided in the system of FIG. 3.

Turning now to FIG. 6A, there is shown a block diagram for the control of a dual primary track car classification yard, with a portion of the track layout illustrated in FIG. 1B. The pattern of the block diagram is somewhat analogous to the pattern of the manner in which the tracks branch out in the yard. The yard utilizes east and west hump tracks as the primary track, with the remaining portion of the track layout branching out from each hump track in the manner illustrated in FIG. 1B. That is, the duel yard enables simultaneous operation of two single yards, each single yard having a track layout identical to that illustrated in FIG. 1B. Basically, this system permits classification of cars from separate control means when dual control is utilized, permitting no crossing over from one track network to the other track network. Under these circumstances, track switch XTS1 of FIG. 6B is always thrown to the left, while track switch XTS2 of FIG. 6B is always thrown to the right. Thus, energization means provided for the control circuits of FIG. 6A permits energization of track selection means for destination tracks stemming from the west hump track from a west track controller W which supplies codes to preliminary storages XP2 and thence to track switch storage X2, while control of the circuits for classification onto destination tracks stemming from the east hump track is provided from an east track controller E which supplies codes to preliminary storages XP1 and thence to track switch storage X1. Preliminary storages XP1 and XP2 each comprise storage means similar to the D, C, and B storages of FIG. 3C, while track switch storages X1 and X2 each comprise storage means somewhat similar to the D storage of FIG. 3C for providing serial readout of information therefrom.

Switching means ES couples output from track switch storage X1 directly to a preliminary storage EP1 and thence to a track switch storage E1, while switching means WS couples output from track switch storage X2 directly to a preliminary storage WP1 and thence to a track switch storage W1. Again, preliminary storages EP1 and WP1 each comprise storage means similar to the C storage of FIG. 3C, while track switch storages E1 and W1 comprise A storage similar to those illustrated in FIG. 3D. Beyond this apparatus, control of the track switches is achieved in a manner identical to that described in conjunction with FIG. 1A. Track switch storage X1 serves to merely transfer coded information in step with progress of a rolling cut on the east hump track when the classification yard is operated in the dual control mode. In FIG. 6A, the designation DO indicates direction of signal flow when the yard is operated in the dual control mode, while the designation SO indicates direction of signal flow when the yard is operated in the single control mode.

In the event single control of the entire car classification yard is to be used, only one of the controllers is to be energized. This is shown in FIG. 6A as being controller W, which now can be used to select any of the destination tracks stemming from both the east and west hump tracks. Assuming the cars to be classified by controller W enter the west hump track, track switch storage X2 receives codes from controller W through preliminary storages XP2 and controls the position of track switch XTS2 accordingly. Then, through switching means WS, the control code for the various track switches to be operated is transferred to either track switch storage E1 through preliminary storage EP1, or to track switch storage W1 through preliminary storage WP1, depending upon which direction the cut is to take. When the coded signal reaches either track switch storage E1 or track switch storage W1, further transfer thereof takes place as explained in connection with FIG. 1A.

In the event that cars to be classified by the single controller W are brought in on the east hump track rather than the west hump track, track switch XTS1 is controlled from track switch storage X2. In this case, switching means WS again transfers the coded signal from track switch X2 to either track switch storage E1 through preliminary storage EP1, or to track switch storage W1 through preliminary storage WP1, depending upon the selected destination for the various cuts. Again, from track switch storage W1 and track switch storage E1, transfer of the coded signal occurs in a fashion identical to that explained in conjunction with FIG. 1A.

The crossover circuitry as delineated by the dotted rectangle in FIG. 6A is illustrated in more detail in FIG. 7. This circuitry is used for operation of the crossover track layout, delineated by the dotted rectangle in the track layout of FIG. 6B. Thus, the crossover circuitry of FIG. 6A may be inserted in the single hump car classification yard control circuitry shown in FIGS. 3A–3D subsequent to the B storage of preliminary storages XP1 in a first single hump track layout and subsequent to the B storage of preliminary storages EP2 in a second single hump car classification yard control circuit similar to that shown in FIGS. 3A–3D. The crossover circuitry is designed to receive parallel-transferred information from the aforementioned B storages; that is, the crossover circuitry is so arranged that it can be coupled to two automatic switching circuits as shown in FIGS. 3A–3D, through the various junctions provided in both circuits. Moreover, the track layout subsequent to each of track switches ETS1 and WTS1 just beyond the crossover tracks is similar to the track layout beyond track switch TS1 of FIG. 1B.

For control of the car classification yard illustrated diagrammatically in FIG. 6B, a crossover circuit 546 (see FIG. 6A) for control of track switches XTS1 and XTS2 is utilized. This circuit requires the capability of handling one additional bit of information as compared to the capability of the circuit for the single hump track yard of FIGS. 3A–3D. Thus, junctions J3″–J10″ are connected to correspondingly numbered junctions J3–J10 of FIG. 3A, while junctions J11″–J12″ for coupling the bit which operates track switches XTS1 and XTS2 to crossover circuit 546 are coupled to correspondingly numbered junctions J11 and J12 which are connected to an additional core (not shown) at the bottom of the B storage of FIG. 3C. Junctions J11 and J12 are connected in a manner similar to the manner in which junctions J3–J10 are connected to the other B storage cores. The additional core merely increases the capability of the aforementioned B storage. Correspondingly, an additional pair of cores must also be added to the C and D storages for controlling track switches XTS1 and XTS2, providing the capability of handling an additional binary bit in track switch storage X2.

Junctions J3″–J12″ are coupled to input minor apertures 401, 406 411 and 416, respectively, of crossover storage cores 1AX1, 1AX3 1AX5 and 1AX7, respectively, included in crossover circuit 546. Junctions J11″ and J12″ are coupled to input minor aperture 418 of crossover storage core 1AX8. Additional crossover storage cores 1AX2, 1AX4 and 1AX6 having output minor apertures 404, 409 and 414, respectively, are provided in crossover circuit 546 for transferring information to cores 1AX1, 1AX3 and 1AX5 through their respective minor apertures 403, 408 and 413. Cores 1AX3, 1AX5 and 1AX7 also are provided with output minor apertures 407, 412 and 417, respectively, for transferring information to cores 1AX2, 1AX4 and 1AX6 through their respective input minor apertures 405, 410 and 415.

A storage description relay XASD is coupled to an output minor aperture 402 of core 1AX1 in a fashion similar to that used for coupling relay DSD to output minor apertures 102 of core 1D1 in FIG. 3C. By means of a similar circuit, a relay XACS is coupled to output minor aperture 419 of core 1AX8. A junction J1″ is connected to junction J1 of FIG. 3C while a junction J2″ is connected to junction J2 of FIG. 3D. Obviously, the jumpers between junctions of FIG. 3 must be removed in order to couple the circuit of FIG. 7 to the circuit of FIG. 3. Radio frequency energy is coupled from junction J1″ through output minor apertures 402 and 419 of cores 1AX1 and 1AX8 respectively, thus permitting energization of relays XASD and XACS when the respective core coupled thereto is in the set condition.

A crossover circuit 547 is also provided, and comprises a group of apertured magnetic cores designated 1BX1–1BX10. Information is coupled from output minor apertures 420, 426, 431, 436 and 441 of cores 1BX1, 1BX3, 1BX5, 1BX6 and 1BX9 respectively, to input minor apertures 425, 429, 434, 439 and 444 of cores IBX2, IBX4, 1BX6, 1BX8 and 1BX10 respectively, when the odd-numbered cores of crossover circuit 547 are cleared. Likewise, information is coupled from output minor apertures 428, 433, 438 and 443 of cores IBX4, IBX6, IBX8 and 1BX10 respectively, to input minor apertures 421, 427, 432, and 437 of cores 1BX1, 1BX3, 1BX5 and 1BX7 respectively, when the even-numbered cores of crossover circuit 547 are cleared. A relay XBSD having a front contact 451 is coupled to output minor apertures 422 of core 1BX1 and 424 of core 1BX2 in a fashion similar to that shown in FIG. 3C for coupling relay CSD through minor apertures 123 of core 1C2 and 120 of core 1C1.

Radio frequency energy is coupled through output minor apertures 422 and 424 from junction J1″, so that relay XBSD is energized when either core 1BX1 or 1BX2 is set. Cores 1BX2, 1BX4, 1BX6 and 1BX8 are provided, with respective output minor apertures 423, 430, 435 and 440. Output bits from these output minor apertures are coupled to respective pairs of junctions J3‴ and J4‴, J5‴ and J6‴, J7‴ and J8‴, and J9‴ and J10‴. These junctions are coupled, by jumpers to their correspondingly numbered junctions J3′–J10′ of FIG. 3D.

A pair of crossover clocks CCA and CCB are provided in the system. Clock CCA has associated therewith contacts 452, 453 and 454. A capacitor 455 is connected to the heel of contact 453, while a capacitor 456 is connected to the heel of contact 454. The other side of each of these capacitors is connected to the negative side of the direct current supply. Back contact 453 and front contact 454 are connected to the positive sides of the direct current supply. Front contact 453 is coupled to the negative side of the direct current supply through the major apertures of cores 1AX1, 1AX3, 1AX5, 1AX7 and 1AX8, while back contact 454 is coupled to the negative side of the direct current supply through the major apertures of cores 1AX2, 1AX4 and 1AX6. Contacts 453 and 454 are operated in unison. Thus, when front contacts 453 and 454 are closed, the left column of cores in crossover circuit 546 is cleared by current due to discharge of capacitor 455 while capacitor 456 acquires a charge; when back contacts 453 and 454 are closed, the right column of cores in crossover circuit 546 are cleared by discharge current from capacitor 456 while capacitor 455 acquires a charge. However, contacts 453 and 454 are not operated until clock CCA is actuated.

When the tag bit is supplied to core 1AX1, relay XASD energizes, closing its front contact 449. This applies energy indicative of the presence of the tag bit to the lower coil of a double coil relay XASDP, which then closes its front contacts 457, 458, 459 and 460. Contact 459, when closed, permits capacitor 197, shown in FIG. 3A, to acquire a positive charge while relay BSDP of FIG. 3A is energized, due to storage of a code in crossover circuit 546. It should be noted therefore that contact 459 of relay XASDP is used in place of contact 163 of relay 1ASDP of FIG. 3B. This is accomplished by coupling the heel of contact 459 to a junction J13″ which is jumpered to junction J13 of FIG. 3A in place of junction J13′ while back contact 459 is coupled to a junction J14″ which is jumpered to junction J14 of FIG. 3A in place of junction J14′.

A pair of track repeater relays XATP and XBTP are provided in association with the detector track circuits for track switches XTS2 and XTS1, respectively. Track repeater relay XATP has associated therewith a pair of contacts 461 and 462, while track repeater relay XBTP has associated therewith a pair of contacts 553 and 554. When the classification yard is operated from a single controller, the contacts of a switch DC are all in the deenergized position; that is, only the back contacts of switch DC are closed. Furthermore, a pair of additional switches XAC and XBC are also provided. These switches are used when the yard is controlled from a single controller. Switch XAC is used for selecting whether the track switch repeater relays for track switch XTS1, or the track switch repeater relays for track switch XTS2 will be used in performing a correspondence check; that is, a check to see whether the actuated track switch has moved to the position called for. With switch XAC in the position shown in FIG. 7D, that is, with its front contacts closed, the correspondence check is performed on track switch XTS2. Therefore, cars to be classified are brought in on the west hump track of FIG. 6B, for classification. However, if the cars were brought in on the east hump track rather than the west hump track, then switch XAC would be thrown in the downward position while switch XBC would be thrown in the upward position. The corerspondence check would thus be performed with the track switch repeater relays for track switch XTS1.

A contact 446 of switch XAC is in the circuit only when the back contacts of switch DC are closed. This is because track switches XTS1 and XTS2 are not actuated when the yard is operated in its dual control mode. Furthermore, switch XBC is shown with its back contacts closed and front contacts open. In this switch position, the circuit is responsive to the condition of the track circuit repeater relay associated with track switch XTS2. It should be noted that switches XAC, XBC and DC may be combined into one three-position switch, since only one of the three aforementioned switches has its front contacts closed at any given time.

When a cut enters the detector track section for track switch XTS2, detector track repeater relay XATP deenergizes, closing its back contact 461. This applies energy through a back contact 465 of switch XBC to the upper coil of a dual coil relay XATNC, which then energizes and closes its front contacts 471, 472, 473, 474 and 475, and opens its back contacts 470 and 475. Front contact 472 energizes relay XATNR through a series circuit comprising back contact 461 of relay XATP, back contact 465 of switch XBC, front contact 457 of relay XASDP, a back contact 466 of switch DC, front contact 446 of switch XAC, a back contact 480 of relay XACSP which is assumed for the present to be deenergized, a front contact 477 of track switch XTS1 repeater relay XARWP, and front contact 472 of relay XATNC. Relay XATNR then energizes, closing its front contacts 488, 489, 490, 491, 492 and 493, and opening its back contact 493. Front contact 489 provides energization for crossover clock CCA.

Starting of clock CCA causes alternate clearing of the left and right columns of storage means 546. When the left column is cleared, the signal stored therein is transferred directly across to the right column, and when the right column is cleared the signal stored in the right column is transferred to the left column but shifted upward by one core, in a manner similar to that described for the D and C storages shown in FIG. 3C. This transfer is accomplished because output minor apertures 407, 412 and 417 of cores 1AX3, 1AX5 and 1AX7, and output minor apertures 404, 409 and 414 of cores 1AX2, 1AX4 and 1AX6 are serially primed with current through a conductor $P_S$. This conductor is energized in series with the coil of relay XATNR, which is stuck through its front contact 492. When the left column of cores is cleared, the bit of information stored in core 1AX8 is destroyed, since no output is coupled from this core to subsequent cores.

Because relay XATNR calls for transfer of the cut to the right, each time core 1AX1 is energized, front contact 449 of relay XASD causes a binary ONE to be transferred through front contact 491 to a serial input conductor coupled to a relay XARI in crossover circuit 547. This relay provides information to the cores of circuit 547 which formerly was stored in crossover circuit 546, in a manner to be described infra.

If it be assumed that when an input code is applied to the storage means of crossover circuit 546, the lowermost bit, that is, the bit applied to core 1AX8 for controlling direction of transfer of the cut through track switch XTS1 or XTS2 is a ONE, core 1AX8 is set and relay XACS is energized, closing its front contact 450 and thereby energizing relay XACSP. This relay then closes its front contacts 480, 481 and 469. In this instance, instead of relay XATNR being energized and calling for a transfer to the right, relay XATNL, which calls for a transfer to the left, is energized when relay XATP deenergizes and energizes relay XATNC in a manner previously described. Thus, relay XATNL is energized through a series circuit comprising back contact 461 of relay XATP, back contact 465 of switch XBC, front contact 457 of relay XASDP, back contact 466 of switch DC, front contact 446 of switch XAC, front contact 480 of relay XACSP, front contact 476 of relay XANWP which is now energized rather than relay XARWP, and front contact 471 of relay XATNC. Thus, front contacts 482–487 of relay XATNL are closed, and back contact 487 of relay XATNL is opened. Front contact 483 energizes crossover clock CCA, and thus the energization and deenergization of relay XASD due to the setting and clearing of core 1AX1 in accordance with the code stored in the storage means of crossover circuit 546 is communicated to a crossover circuit 549 through front contact 485 of relay XATNL. This circuit is identical to crossover circuit 547, and the means for applying information thereto is also identical to that to be described for crossover circuit 547 infra.

It should be noted that whether the normal or reverse track switch repeater relays for track switches XTS1 and XTS2, namely, relays XBNWP, XBRWP, XANWP and XARWP are energized, depends upon whether front or back contact 496 of relay XACS is closed. This is because front contact 496 energizes relays XANWR and XBNWR, which call for throwing track switches XTS1 and XTS2 to the left, while when back contact 496 is closed, relays XARWR AND XBRWR are energized, calling for throwing track switches XTS1 and XTS2 to the right. The heel of contact 496 is energized through the series connection of front contact 462 of relay XATP and 460 of relay XASDP, a front contact of switch XAC, and a back contact 529 of switch DC. This circuit permits a change in track switch XTS2 position only when the track circuit associated with this switch is unoccupied, a code is stored in crossover circuit 546, and the system is in its single control mode. A similar circuit through contact 554 of relay XBTP and contact 445 of switch XBC permits change of track switch XTS1 position.

If the track switch repeater relay position does not correspond to the position called for by the bit stored in core 1AX8, energy from contact 446 of switch XAC cannot reach contacts 471 and 472 of relay XATNC, thereby preventing the start of crossover clock CCA by keeping relays XATNL and XATNR deenergized. Therefore, contacts 476, 477, 478 and 479 of the track switch repeater relays, in combination with contacts 480 and 481 of relay XACSP, serve as a correspondence check for the track switches, preventing transfer of the code until the position of the track switches corresponds to the position called for by the code.

Front contacts 482 of relay XATNL is connected in parallel with front contact 488 of relay XATNR. Closing of either of these contacts causes energization of a relay XATNP having front contacts 497 and 499 and a back contact 498. When the crossover clock starts operating, relay XASDP becomes stuck in the picked-up position through its own front contact 458 and front contact 497 of relay XATNP. Back contact 498, upon opening, prevents intermittent energization of the lower coil of relay XASDP which otherwise would follow the opening and closing of front contact 449 of relay XASD.

Closing of front contact 499 of relay XATNP provides energization for the upper coil of a dual coil relay XATN. This relay, upon energization, opens its back contacts 500, 501 and 502, and closes its front contacts 501 and 502. However, as previously explained, relays XATNL and XATNR are not energized until relay XATP deenergizes, either relay XATNL or XATNR, depending upon the desired direction of transfer, is energized. The energized relay then sticks through its front contact 486 or 492, respectively. Furthermore, energization of either of these relays causes energization of relay XATNP, in turn energizing relay XATN. Thus, back contacts 500 and 501 of relay XATN are opened subsequent to the closing of relay XATNL or XATNR, and therefore are ineffectual to prevent transfer of the code from the storage means of crossover circuit 546 to crossover circuit 547. It should also be noted that front contact 501 of relay XATN causes the relay to stick in the picked-up condition. This prevents a change in the energization of relays XATNL and XATNR during the interval in which a cut is present on the detector track section for track switch XTS2, since as long as back contact 461 of relay XATP is closed, relay XATN is energized, keeping relay XATNC from again becoming energized. Thus, a new path for energization of either relay XATNL or XATNR through front contact 471 or 472 of relay XATNC is prevented.

Built-in protection against reverse transfer of coded information is provided in the system. Thus, during intervals in which relay XATNC is deenergized, back contact 470 is closed, causing priming of input minor apertures 401, 406, 411, 416 and 418 of cores 1AX1, 1AX3, 1AX5, 1AX7 and 1AX8, respectively, through a current limiting resistor 506. This priming prevents reverse transfer of information when the left column of cores in crossover circuit 546 is cleared. However, during clearing of the left column of cores in crossover circuit 546, it is desirable to remove this input prime current. This is accomplished by opening back contact 498 of relay XATNP when either relay XATNL or XATNR is energized. Thus, during the running of clock CCA, the input prime current through conductor $P_I$ is removed. Moreover, upon energization of relay XATNC, which occurs in the event relay XATN is deenergized at the time track repeater relay XATP deenergizes, back contact 470 of relay XATNC is opened, again removing the input prime current from the input minor apertures of the cores in the left column of the A storage for track switches XTS1 and XTS2. This contact assures removal of the input prime current prior to the start of crossover clock CCA. When removal of the input prime current is achieved by opening of back contact 498 of relay XATNP, reapplication of this current through back contact 470 of relay XATNC is prevented by energization of relay XATN which opens its back contacts 500 and 501 and thereby prevents reenergization of relay XATNC. The importance of limiting the number of prime currents applied simultaneously to a core has previously been discussed.

A cancellation relay HACN having a contact 503 is connected through a back contact 463 of switch XBC to a manual cancellation push button XACN. Depression of push button XACN energizes relay HACN, closing front contact 503 and thereby causing discharge of a capacitor 504, coupled thereto, through back contacts 493 of relay XATNR and 487 of relay XATNL, and through the major apertures of all the cores in crossover circuit 546. It should be noted however, that in the event either relay XATNL or XATNR is energized, the discharge of capacitor 504 takes place through a resistor 505, without passing through the major apertures of the cores in crossover circuit 546. This feature prevents code cancellation at any time when a serial code transfer is in progress. When relay HACN is deenergized however, capacitor 504 acquires a charge through back contact 503 of relay HACN and either back contact 502 of relay XATN, or front contact 502 of relay XATN and back contact 475 of relay HATNC, depending upon whether or not relay XATN is energized.

Automatic code cancellation similar to that built into the A storages of FIG. 3 is built into the crossover circuits. Automatic code cancellation occurs whenever a correspondence check indicates the track switch position is out of correspondence with the called-for position. Relay XATNC is thus energized without either relay XATNL or XATNR being energized. Relay XATN is thereby energized through contact 474 of relay XATNC, without application of serial prime current on conductor $P_S$. Energization of relay XATN causes its front contact 502 to close, thereby discharging capacitor 504 through a series circuit comprising back contact 503 of relay HACN, front contact 502, front contact 475 of relay XATNC, back contact 493 of relay XATNR, back contact 487 of relay XATNL, and the major apertures of the cores in crossover circuit 546, destructively clearing these cores.

Automatic code cancellation is also effected whenever the code cannot be transferred ahead to crossover circuit 549 or 547. For example, relay XATNL or XATNR cannot be energized when relay XATP deenergizes, since a code is stored in crossover circuit 549 or 547, as the case may be, maintaining either relay XBSDB or XBSDA respectively energized and leaving contact 520 or 519 open. If the cut leaves the track circuit with this condition still in existence, relay XATP again energizes. Relay XATN then energizes through a series circuit comprising front contact 461 of relay XATP, back contact 464 of switch XBC and front contact 474 of relay XATNC. Capacitor 504 is thereby discharged through the same circuit described for the out-of-correspondence automatic code cancellation.

Similar automatic cancellation capabilities exist with respect to both crossover track switch XTS2 and XTS1. However, in the dual mode of operation, relay XATNR is energized, preventing automatic code cancellation by opening its back contact 493. This will become apparent, infra.

Information is read into the cores of crossover circuit 547 serially through closed front contact 491 of relay XATNR by intermittent opening and closing of contact 499 of relay XASD. Crossover circuit 547 includes two columns of cores, the left column comprising cores 1BX1, 1BX3, etc., through core 1BX9, while the right column of cores includes cores 1BX2, 1BX4, etc., through core 1BX10. Information is applied to the lowermost core in the left hand column, core 1BX9, through an input minor aperture 442. A front contact 494 of relay XARI is coupled through minor aperture 442, while back contact 494 is coupled to the positive side of the direct current power supply. The heel of contact 494 is coupled to a capacitor 495 having its other side connected to the negative side of the direct current supply. Closing of back contact 494 thus causes capacitor 495 to acquire a charge; closing of front contact 494 causes capacitor 495 to discharge through minor aperture 442 of core 1BX9, thereby setting the core. Thus, each time relay XARI is energized, core 1BX9 is set by discharge of capacitor 495, while when relay XARI deenergizes, capacitor 495 acquires a charge.

Assuming a transfer is being made to the right by track switch XTS2, front contact 452 of crossover clock CCA periodically energizes a relay XCPB through closed front contact 490 of relay XATNR over an advance conductor. Periodic energization and deenergization of relay XCPB causes alternate opening and closing of its front and back contacts 507 and 508. The heels of contacts 507 and 508 are connected to capacitors 509 and 501, respectively, each of which has its other side connected to the negative side of the direct current supply. Back contact 507 and front contact 508 are connected to the positive side of the direct current supply. Front contact 507 is coupled through the major apertures of the cores comprising the left column of crossover circuit 547, while back contact 508 is coupled through the major apertures of the cores comprising the right column of the crossover circuit. Since contacts 507 and 508 operate in unison, the left and right columns of the cores in crossover circuit 547 are clearly alternately. Output minor apertures 420, 426, 431, 436 and 441 of the cores in the left column of crossover circuit 547 are coupled to corresponding input minor apertures 425, 429, 434, 439 and 444 of the cores in the right column of crossover circuit 547. Similarly, output minor apertures 428, 433, 438 and 443 of cores 1BX4, 1BX6, 1BX8 and 1BX10, respectively, are coupled to input minor apertures 421, 427, 432 and 437 of respective cores 1BX1, 1BX3, 1BX5 and 1BX7. All the aforementioned output minor apertures of the cores in crossover circuits 547, with the exception of minor apertures 422 and 424 of cores 1BX1 and 1BX2, respectively, are serially primed through a back contact 511 of a relay XBSDP.

The heel of contact 511 is connected to the positive side of the direct current supply through a current limiting resistor 513. Front contact 511 primes output minor apertures 423, 430, 435 and 440 of cores 1BX2, 1BX4, 1BX6 and 1BX8, respectively, through current limiting resistor 513. These output minor apertures are coupled to respective input minor apertures 151, 154, 157 and 158 of cores 1A1, 1A2, 1A3 and 1A4, of FIG. 3D through correspondingly numbered junctions J3‴ through J10‴ and J3′ through J10′.

Relay XBSDP is operated from front contact 451 of relay XBSD through a forward-connected diode 514. Similarly, a relay XBSDA is operated from front contact 451 of relay XBSD through a forward-connected diode 515 coupled thereto by a conductor LA2. Thus, relays XBSDP and XBSDA are energized when relay XBSD is energized. A front contact 512 of relay XBSDP is coupled to the coil of relay XBSDA by a conductor LA1. Diode 515 prevents formation of an energization path over conductors LA1 and LA2 for relay XBSDP when its front contact 512 is closed. Likewise, diode 514 prevents energization of relay XBSDA due to an induced current caused by opening the energization circuit for relay XBSDP. A third contact 516 of relay XBSDP is provided, having its heel coupled to a capacitor 517 which in turn has its opposite side connected to the negative side of the direct current supply. Back contact 516 is connected to the positive side of the direct current supply, so that when relay XBSDP is deenergized, capacitor 517 acquires a charge. Front contact 516 is connected to relay XCPB, so that discharge of capacitor 517 momentarily energizes relay XCPB. An additional back contact 518 is added to relay 1ASDP of FIG. 3B and is coupled between relay XBSDP and the negative side of the direct current supply.

When the tag bit is applied to relay XARI from front contact 449 of relay XASD, as previously explained, core 1BX9 becomes set. Simultaneously with clearing of the left column of cores in crossover circuit 546, relay XACB requires energization. Core 1BX9 becomes set prior to opening of front contact 449 of relay XASD. Front contact 507 of relay XCPB then closes, clearing the left column of cores in crossover circuit 547 by discharging charged capacitor 509 through the major apertures of these cores. Upon clearing of cores 1BX9, core 1BX10 becomes set through its input minor aperture 444, since output minor aperture 441 of core 1BX9 is primed through back contact 511 of relay XBASP. When clock CCA next opens its front contacts and closes its back contacts, the information bit stored in core 1AX2, previously stored in core 1AX3, is transferred to core 1AX1 through its input minor aperture 403. Depending upon whether the bit now stored in core 1AX1 is a binary ONE or ZERO, front contact relay XASD is either energized or deenergized. Relay XARI, which is responsive to the condition of relay XASD, then transfers either a ONE to core 1BX9, by setting the core upon energization thereof, or transfers a ZERO to the core by remaining deenergized, thereby not setting the core. Meanwhile the tag bit previously transferred to core 1BX10 is transferred to core 1BX7 through its input minor aperture 437 upon deenergization of clock CCA, since relay XCPB is thereby deenergized, closing back contact 508 and thereby discharging capacitor 510 through the major apertures of the cores in the right column of crossover circuit 547.

Upon closing of the front contacts of crossover clock CCA, relay XCPB again energizes, causing discharge of capacitor 509, which has acquired a charge during the interval in which relay XCPB was deenergized, through front contact 507 and through the major apertures of the cores in the left column of crossover circuit 547. Thus, the information stored in core 1BX9 is transferred to core 1BX10 through its input minor aperture 444, while the information stored in core 1BX7, namely the tag bit, is transferred to core 1BX8 through its input minor aperture 439. Thus, closing of the front contacts of crossover clock CCA causes transfer of the information stored in the left column of cores in crossover circuit 547 to transfer directly to the corresponding core on the right, and upon opening of the front contacts of crossover clock CCA, the information stored in the right column of cores of crossover circuit 547 is transferred to the left and upward one core. In like manner, the code stored in crossover circuit 546 shifts directly across to the right each time the crossover clock front contacts are closed, and shifts to the left and up one core each time the crossover clock back contacts are closed. It should here be noted that upon occurrence of the first clear pulse through the left column of cores in crossover circuit 546, the portion of the code stored in core 1AX8 is destroyed, since no core is provided for receiving output from core 1AX8.

When the tag bit is finally transferred to core 1BX1, setting the core, relay XBSD is energized, closing its front contact 451 and thereby energizing relays XBSDA and XBSDP. Relay XBSDA therefore opens its back contact 519 which is connected in series with the coil of relay XATNR. Thus, relay XATNR deenergizes, opening its front contact 489 and thereby stopping clock CCA. Furthermore, front contact 488 opens, deenergizing relay XATNP, which in turn opens its front contact 499, deenergizing relay XATN. Moreover, energization of relay XBSDP opens its back contact 511, preventing priming of minor apertures 428, 433, 438 and 443 of cores 1BX4, 1BX6, 1BX8 and 1BX10 respectively, and causes front contact 516 to close, thereby discharging capacitor 517 through relay XCPB. Front contact 507 of relay XCPB then closes, transferring the code formerly stored in cores 1AX1, 1AX3, 1AX5 and 1AX7 and which is now stored in cores 1BX1, 1BX3, 1BX5 and 1BX7, to cores 1BX2, 1BX4, 1BX6 and 1BX8. Relay XBSD remains energized, since core 1BX2 is set. When capacitor 517 has discharged sufficiently so that relay XCPB deenergizes, back contact 508 of relay XCPB closes, discharging charged capacitor 510 through the right column of cores in crossover circuit 547.

Minor apertures 423, 430, 435 and 440 of respective cores 1BX2, 1BX4, 1BX6 and 1BX8 become primed through closing of front contact 511 of relay XBSDP, while back contact 511 of relay XBSDP is open, preventing transfer of the code back into the left column of cores, as previously explained. Thus, when cores 1BX2, 1BX4, 1BX6 and 1BX8 are cleared, the code is transferred out of minor apertures 423, 430, 435 and 440 and into respective cores 1A1, 1A2, 1A3 and 1A4 of FIG. 3D through respective input minor apertures 151, 154, 157 and 158. Relay XBSD then deenergizes, causing deenergization of relays XBSDA and XBSDP.

A code stored in cores 1BX2, 1BX4, 1BX6 and 1BX8 cannot be transferred to cores 1A1, 1A2, 1A3 and 1A4 if a code is already stored therein, since relay 1ASDP is always energized when an information bit is stored in core 1A1. This causes an additional back contact 518 on relay 1ASDP to be held open, preventing relay XBSDP from energizing. The code in crossover circuit 547 is therefore stored in the left column of cores. As soon as the code stored in cores 1A1–1A4 is transferred forward, relay 1ASDP deenergizes, completing a circuit through the coil of relay XBSDP, and causing transfer of the code out of crossover circuit 547, as previously explained.

In the event a code applied to crossover circuit 546 should set core 1AX8, relay XACS is energized, thereby energizing relays XANWR and XBNWR. Track switches XTS1 and XTS2 are thus positioned to the left, thereby energizing relays XBNEP and XANWP, and deenergizing relays XARWP and XBRWP. Under these circumstances, front contacts 476 and 478 are closed, while front contacts 477 and 479 are open. Relay XATNL is now energized, rather than relay XATNR as previously explained. This is because front contact 450 of relay XACS is closed, energizing relay XACSP, which closes its front contacts 480 and 481. Thus a complete circuit can be traced to relay XATNL from the series circuit comprising front contact 471 of relay XATNC which is energized as explained previously, front contact 476 of relay XANWP, front contact 480 of relay XACSP, the front contact of switch XAC, back contact 466 of switch DC, front contact 457 of relay XASDP, which is energized as previously explained, back contact 465 of switch XBC and back contact 461 of relay XATP which is deenergized when a cut enters the detector track section associated with track switch XTS2.

Energization of relay XATNL causes its front contacts 484 and 485 to close. Contact 485 completes a circuit to the serial input conductor for crossover circuit 549 of FIG. 7B, which is shown in block form since the circuitry of crossover circuit 549 is identical to the circuitry of crossover circuit 547 of FIG. 7D. Contact 484 completes a circuit from clock CCA contact 452 to an advance conductor for crossover circuit 549. In this fashion therefore, a code stored in the storage means of crossover circuit 546 is transferred to the left, or normal direction, and is applied to crossover circuit 549. At this point it is well to note that the circuitry of crossover circuit 548 of FIG. 7A is identical to the circuitry of crossover circuit 546.

To briefly recapitulate the general operation of the crossover circuit of FIG. 7 when the car classification yard is operated in the single control mode, a code is transferred from the B storage of FIG. 3C to crossover circuit 546 by parallel code transfer. When the detector track circuit repeater relay for track switch XTS2 deenergizes due to presence of a cut shunting the track circuit associated with track switch XTS2, the code stored in crossover circuit 546 is then serially transferred to either crossover circuit 547 or crossover circuit 549, depending upon whether the bit stored in core 1AX8 is a binary ZERO or ONE; that is, whether core 1AX8 is in the clear or set condition. The code is then transferred from the crossover circuit in which it is stored to a subsequent A storage coupled thereto, and thence to successive storages in a manner similar to that described for operation of the FIG. 3.

Assume now that cars to be classified are brought in on the east hump track rather than the west hump track, while the yard is still being operated in the single control mode. Under these circumstances, front contacts 463, 464, 465 and 445 of switch XBC are closed, and back contact 446 of switch XAC is closed. Also under these circumstances, the correspondence check for track switch positions is now made by track switch repeater relays XBNWP and XBRWP. This is because track switch repeater relays XBNWP and XBRWP are associated with track switch XTS1, while track switch repeater relays XANWP and XARWP are associated with track switch XTS2.

When front contact 463 of switch XBC is closed, push button XACN is out of the circuit. Cancellation of the code stored in the cores of crossover circuit 546 is now brought about by depressing a cancellation push button XBCN. Likewise, closing of front contact 464 of switch XBC enables control of relay XATN from detector track repeated relay XBTP associated with track switch XTS1. Detector track repeater relay XATP coupled to the detector track section associated with track switch XTS2 is now out of the circuit. Thus, relay XATN is energized through a series circuit comprising front contact 474 of relay XATNC, front contact 464 of switch XBC, a back contact 467 of switch DC, and front contact 463 of track repeater relay XBTP.

Front contact 445 of switch XBC is coupled in series with front contact 554 of relay XBTP and front contact 460 of relay XASDP to back contact 529 of switch DC. This circuit permits a change in track switch XTS1 position only when the track circuit associated with the switch is unoccupied, a code is stored in crossover circuit 546, and the system is in its single control mode.

Finally, contact 446 of switch XAC receives energy from back contact 553 of relay XBTP when the detector track circuit associated with track switch XTS1 is occupied by a cut. This circuit is completed through back contact 553 of relay XBTP, a back contact 468 of switch DC, front contact 465 of switch XBC, front contact 457 of relay XASDP which is energized as previously explained, and back contact 466 of switch DC.

Now, instead of single control for the entire classification yard, assume dual control is utilized. This requires that both switches XBC and XAC have their back contacts closed, while switch DC has its front contacts closed. Under these circumstances, cars on the east hump track of FIG. 6B can be classified onto tracks in the eastern portion of the classification yard only, while cars on the west hump track can be classified onto tracks in the western portion of the classification yard only. Track switches XTS1 and XTS2 are held in positions to prevent any crossing over of cuts being classified, as described below.

Figure 7D:
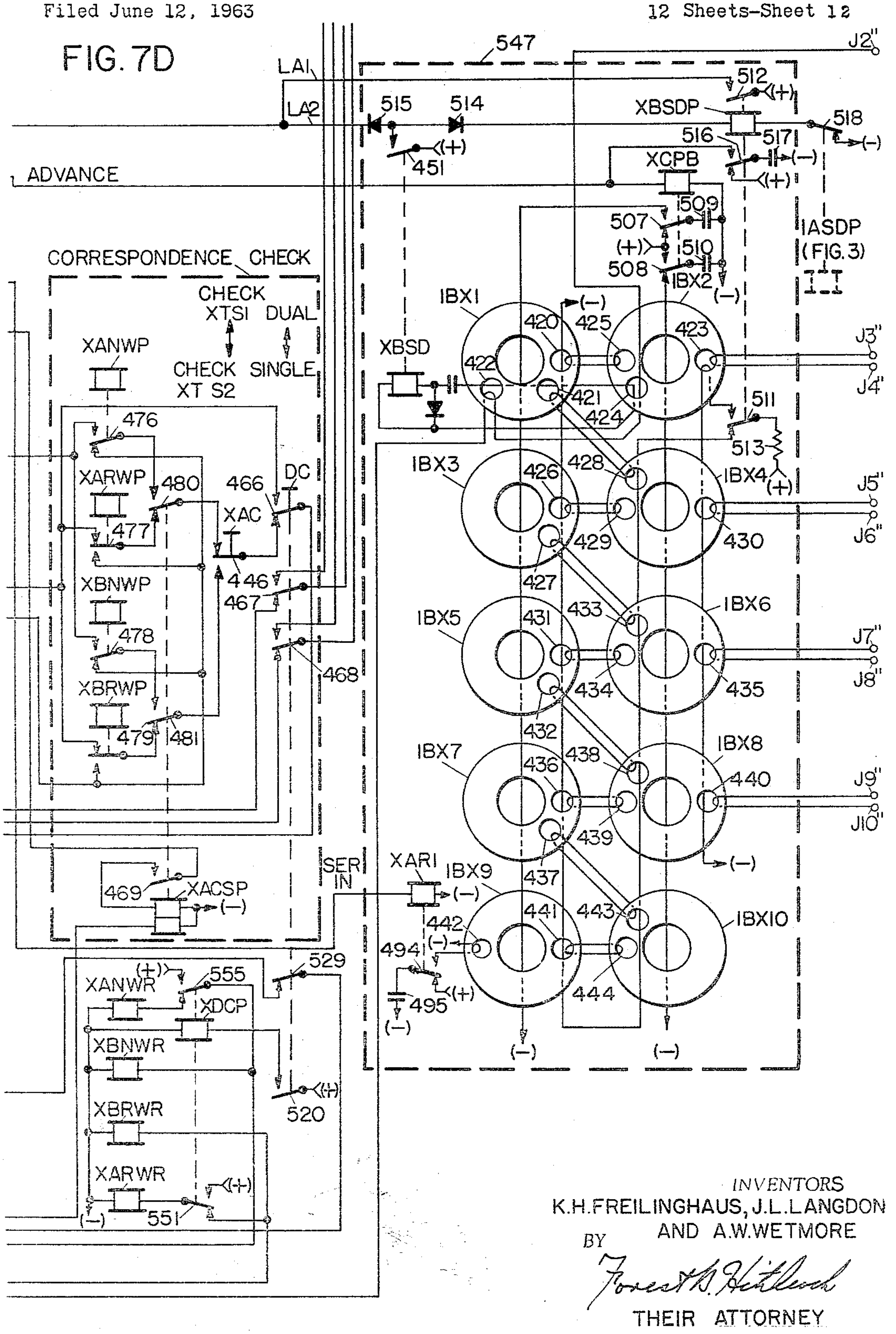

Switch DC of FIG. 7D, when thrown in the dual control mode, energizes east tracks selection means E and the west tracks portion of selection means W of FIG. 6A. The front contacts of switch DC are now closed, and the back contacts are open. Back contact 529 of the switch thus removes energy from contact 496 of relay XACS. In addition, a front contact 520 of switch DC is closed, energizing a relay XDCP having contacts 550 and 551. Relay XDCP when unenergized closes its back contact 550 which connects relays XBNWR and XANWR in parallel, and closes its back contact 551 which connects relay XARWR and XBRWR in parallel. This permits simultaneous actuation of the parallel-connected relays from contact 496 of relay XACS when the yard is operated in the single control mode. However, when the yard is placed in the dual control mode, relay XDCP is energized from front contact 520 of switch DC, thereby coupling energy from its front contact 550 to relay XBNWR, causing track switch XTS1 to be thrown to the left, and from its front contact 551 to relay XARWR, causing track switch XTS2 to be thrown to the right. The condition of relay XACS is ineffectual to actuate either track switches XTS1 or XTS2 in this mode of operation.

Opening of back contact 466 of switch DC takes contact 446 of switch XAC out of the circuit. The correspondence check performed by relays XANWP, XARWP, XBNWP and XBRWP is thus not performed. Moreover, front contact 466 of switch DC only permits energization of relay XATNR. This permits transfer of the code from the storage means of crossover circuit 546 to crossover circuit 547 only, and prevents transfer to crossover circuit 549 in the manner previously described. In like fashion, a code stored in the storage means of crossover circuit 548 is transferred to crossover circuit 549 only. This is because front contacts 467 and 468 of switch DC are closed. Closing of front contact 467 connects front contact 553 of detector track circuit repeater relay XBTP to a relay XBTNP through a front contact 521 of a relay XBTNC when relay XBTNC is energized. Front contact 468 of switch DC connects back contact 553 of detector track repeater relay XBTP to a front contact 527 of a relay XCSDP.

Thus, when a code is applied to input terminals XJ1″–XJ12″ of crossover circuit 548 from a preceding B storage for the east hump track, the tag conductor of the crossover circuit is energized, energizing relay XCSDP. This relay then closes its front contacts 526, 527 and 528. Opening of back contact 526 prevents transfer of a new code stored in the preceding B storage for the east hump track from being transferred into crossover circuit 549 through junctions XJ13″ and XJ14″ in a manner similar to that described for preventing transfer of a code from a preceding B storage through junctions J13″ and J14″ into crossover circuit 547.

When a cut enters the detector track section for track switch XTS1, relay XBTP deenergizes, closing back contact 553. This provides energization through front contact 468 of switch DC to the upper coil of a dual coil relay XBTNC which then closes its front contacts 521, 522, 523 and 525 and opens its back contacts 524 and 525. Energy is now applied through a series circuit comprising back contact 553 of relay XBTP, front contact 468 of switch DC, front contact 527 of relay XCSDP and front contact 522 of relay XBTNC to a relay XBTN, energizing this relay. Relay XBTN then closes its front contacts 531, 532, 533, 534 and 535, and opens its back contacts 534 and 535. Front contact 531 applies energy to crossover clock CCB, which in turn alternately opens and closes its front contacts 536, 537 and 538 in unison, and alternately opens and closes its back contacts 537 and 538 in unison. In addition, relay XBTN is stuck in the picked-up condition through its front contact 532. Closing of front contact 534 of relay XBTN completes a circuit from the tag conductor of crossover circuit 548 to the serial input conductor of crossover circuit 549, so that information can now be serially read from the storage means of crossover circuit 548 into the storage means of crossover circuit 549 through this contact.

Thus, while clock CCB is alternately opening and closing its contacts, a capacitor 539 is discharged through closed front contact 537 causing the left column of cores in crossover circuit 548 to transfer the code stored therein to the right column of cores of the circuit, while a capacitor 540 coupled to the heel of closed front contact 538 acquires a charge. When back contacts 537 and 538 are closed, capacitor 540 discharges through the major apertures of the cores in the right column of crossover circuit 548, causing transfer of the information stored therein into the left column of cores and upward by one core in the manner similar to that explained for crossover circuit 546. Moreover, when back contact 537 is closed, capacitor 539 acquires a charge. Alternate closing and opening of front contact 536 causes information read into the storage means of crossover circuit 549 through its advance conductor to fill the storage means in the manner similar to that described for front contact 452 of crossover clock CCA in filling the storage means of crossover circuit 547 with information formerly stored in the storage means of crossover circuit 546.

When the storage means of crossover circuit 549 has completely filled with the information formerly stored in the storage means of crossover circuit 548, a relay XBSDB is energized from crossover circuit 549 through a conductor LB2 in a fashion similar to that by which relay XBSDA is energized from crossover circuit 547 over a conductor LA2. Conductor LB1 functions in relation to crossover circuit 549 and relay XBSDB similar to conductor LA1 in relation to crossover circuit 547 and relay XBSDA.

Relay XBSDB has associated therewith a pair of back contacts 541 and 520. Back contact 520 is connected in series with relay XATNL. Thus, when the yard is operated in the single control mode and information formerly stored in the storage means of crossover circuit 546 has been transferred to the storage means of crossover circuit 549, contact 520 opens, deenergizing relay XATNL, thereby opening the circuit from front contact 449 of crossover circuit 546 to the serial input capacitor of crossover circuit 549.

Similarly, after transfer of information has taken place from crossover circuit 548 to crossover circuit 549, relay XBSDB opens its back contact 541, causing relay XBTN to deenergize. This opens front contact 531, halting operation of crossover circuit CCB. Additionally, front contact 534 opens, thereby opening the serial transfer circuit between crossover circuits 548 and 549. Moreover, opening of front contact 533 deenergizes relay XBTNP. If at this time the cut still shunts the detector track section for track switch XTS1 after the code has been transferred from crossover circuit 548 to crossover circuit 549, deenergization of relay XBTNP, which causes its back contact 542 to again close, causes relay XBTNC to again energize, closing its front contact 522. However, relay XBSDB remains energized until the code is transferred from crossover circuit 549 to the subsequent track switch storage X3, at which time neither conductors LB1 or LB2 are energized, permitting relay XBSDB to deenergize in a manner similar to that described for deenergization of relay XBSDA.

Depression of code cancellation push button XBCN when the front contacts of switch XBC are closed and the back contacts of switch DC are closed energizes relay HACN, causing cancellation of the code stored in the storage means of crossover circuit 546. However, since the back contacts of switch XBC are closed and the front contacts of switch DC are closed, depression of push button XBCN now energizes relay HBCN, which then opens back contact 530, and closes front contact 530. This causes discharge of a charged capacitor 545 through the major apertures of all the cores in crossover circuit 548, thereby clearing the cores. When relay HBCN is deenergized, capacitor 545 acquires a charge through back contact 530 of relay HBCN and a back contact 544 of relay XBTNP. Similarly, if relay XBTNC is deenergized while relay XBTNP is energized, capacitor 545 acquires its charge through a series circuit comprising back contact 530 of relay HBCN, front contact 544 of relay XBTNP and back contact 525 of relay XBTNC. It should be noted however that in the event relay XBTN is energized, thereby causing clock CCB to initiate transfer of information from crossover circuit 548 to crossover circuit 549, energization of relay HBCN causes discharge of capacitor 545 through a series circuit comprising front contact 530 of relay HBCN and front contact 535 of relay XBTN. The capacitor discharge therefore takes place across a resistor 555 connected in series with front contact 535, and is thus ineffectual to clear the cores in crossover circuit 548 when information transfer is in progress.

It is now obvious that the car classification yard can be operated in any desired mode; either dual control, or single control with cars to be classified entering on either hump track. The system employs passive solid state devices for storage purposes, decreasing maintenance requirements for the system. Serial rather than parallel transfer of information is used where the transfer is likely to occur over large distances, thereby decreasing the amount of wiring necessary in the yard. The system is compact and has minimal power requirements. Moreover, by utilizing additional cores in the columns of cores in the system, the capability of transferring information along with each cut in addition to route information is also provided. The system also readily lends itself to modular type construction, permitting easy interchange of components.

Although the system of this invention has been described in conjunction with automatic switching of railroad cars in a railway car classification yard, it is obvious that the general principles embodied in this invention may be equally applicable whenever it is desired to selectively direct vehicles or objects from a single primary route to a preselected one of a number of branch routes. Thus, for example, the system may be used in automatic routing of objects or materials on a conveyor system.

Although but several specific embodiments of the present invention have been described, it is to be specifically understood that these forms are selected to facilitate in disclosure of the invention rather than to limit the number of forms which it may assume; various modifications and adaptations may be employed to the specific forms shown to meet requirements of practice, without in any manner departing from the spirit or scope of the invention.

What we claim is:

1. In control means for a railway car classification yard including a plurality of track switches, the combination comprising a plurality of storage means, each said storage means including apertured magnetic cores, means coupling a coded signal into a first of said storage means, means coupling the signal sequentially through each of said storage means, and means responsive to the remanent magnetic state of one core in at least one of said storage means for positioning a track switch associated with said storage means.

2. The control means of claim 1 wherein transfer of the code from one storage means to a subsequent storage means is initiated by means coupling a pulse through the apertured magnetic cores containing the coded information, said means coupling the pulse being actuated only when the subsequent storage means contains no code stored therein.

3. Control means for a railway car classification yard comprising, a plurality of columns of apertured magnetic cores having input and output means, conducting means coupled through the major apertures of the cores of each column, means selectively energizing the conducting means for clearing the cores in selected columns in step with the progress of a rolling cut of cars through the yard, means coupling the output means from a first of said columns to the input means of one of two successive columns for transferring a signal thereto when the conducting means coupled through the major apertures of the cores of the preceding column is energized, and means coupling the output means of said one successive column to the input means of either of two subsequent successive columns for transferring a signal thereto when the conducting means coupled through the major apertures of the cores of said one successive column is energized.

4. The control means of claim 3 including detector track circuits in said yard whereby said means selectively energizing the conducting means is responsive to shunting of the detector track circuits by a rolling cut.

5. Control means for a railway car classification yard comprising a plurality of columns of apertured magnetic cores, conducting means coupled through the major aperture of each core of every column, means selectively energizing the conducting means for clearing the cores in selected columns, means selectively threading set pulses through input minor apertures of the cores in a first column in accordance with a predetermined code, means coupling signals from output minor apertures of the cores of said first column to input minor apertures of the cores of a second column for setting the cores in the second column in accordance with the code, and means selectively coupling signals from output minor apertures of the cores of said second column to input minor apertures of the cores in either one of third or fourth columns.

6. The control means of claim 5 wherein the direction of transfer of the signals from the output minor apertures of the cores of said second column to the input minor apertures of either one of a third or fourth column is determined by the condition of switching means priming selected output minor apertures of the cores in the second columns, said switching means being coupled to a single core in said second column and responsive to the remanent magnetic state of said single core.

7. Means for serially transferring a coded signal stored in a first pair of columns of apertured magnetic cores to a second pair of said columns comprising means alternately clearing the columns of each pair, means coupling an output from each core in a first column of each pair to a core in a second column of each pair when said first columns are cleared, means coupling an output from said core in the second column of each pair to a core other than said core in the first column of each pair when said second columns are cleared, serial transfer means coupling a single core in the first column of the first pair to a single core in the first column of the second pair, and means energizing said serial transfer means in accordance with the remanent magnetic state of the single core in the first column of the first pair and setting the single core in the first column of the second pair in accordance with said remanent magnetic state.

8. The means for serially transferring the coded signal of claim 7 having additional means for opening the circuit alternately clearing the cores wherein clearing of the cores is halted, said additional means being coupled to said single core in the first column of the second pair and being responsive to the remanent magnetic state of said single core in the first column of the second pair.

9. Means for serially transferring a coded signal stored in a first pair of columns of apertured magnetic cores to a second pair of said columns comprising means alternately clearing the columns of each pair, means coupling an output from each core in a first column of each pair to the core in a second column of each pair at the same columnar level when said first columns are cleared, means coupling an output from said core in the second column of each pair to the core in the first column of each pair at the next higher columnar level when said second columns are cleared, serial transfer means coupling the uppermost core in the first column of the first pair to the lowermost core in the first column of the second pair, and means energizing said serial transfer means in accordance with the remanent magnetic state of the uppermost core in the first column of the first pair and setting the lowermost core in the first column of the second pair in accordance with said remanent magnetic state.

10. The means for serially transferring the coded signal of claim 9 having additional means for opening the circuit alternately clearing the cores wherein clearing of the cores is halted, said additional means being coupled to the uppermost core in the first column of the second pair and being responsive to the remanent magnetic state of the uppermost core in the first column of the second pair.

11. Means for transferring a code stored in a group of multiple aperture magnetic cores to one of a pair of circuits in accordance with the code comprising means threading the major apertures of the cores for clearing said cores, means coupling outputs from first minor apertures of all but one core to a first circuit, means coupling outputs from second minor apertures of all but said one core to a second circuit, control means coupled to said one core and responsive to the magnetic state of said one core, means threading said first minor apertures for priming thereof, means threading said second minor apertures for priming thereof, and means responsive to said control means for energizing either of said means threading the minor apertures.

12. The apparatus of claim 11 wherein the control means comprises the coil of a relay and the means responsive to said control means for energizing either of said means threading the minor apertures comprises a front and back contact of the relay, said front contact being coupled to the means threading said first minor apertures and said back contact being coupled to the means threading said second minor apertures.

13. The control circuit for the railway car classification yard of claim 11 including additional means responsive to position of a track switch coupled in series with the means threading the first and second minor apertures of the cores for open-circuiting said last named means whenever the actual position of the track switch is out of correspondence with the position called for by the code.

14. The control circuit for the railway car classification yard of claim 11 including additional means responsive to the magnetic condition of a succeeding group of cores coupled in series with the means threading the first and second minor apertures of the core for open-circuiting said last named means whenever a code is stored in the succeeding group of cores.

15. In a control circuit for a railway car classification yard, the combination comprising a plurality of storage means, each said storage means including apertured magnetic cores, means coupling a coded signal comprising a plurality of binary bits into a first of said storage means wherein said bits establish remanent magnetic flux conditions within the cores, and switching means responsive to the remanent magnetic flux of a predetermined core for controlling the direction of transfer of a portion of said signal to one of a pair of storage means in step with the progress of a rolling cut of cars through the classification yard.

16. In a control circuit for a railway car classification yard, the combination comprising first storage means comprising a number of apertured magnetic cores, means coupling a coded signal comprising the number of binary bits into the first storage means wherein said bits establish remanent magnetic flux conditions within the cores, second and third storage means comprising one less than said number of apertured magnetic cores, and switching means responsive to the remanent magnetic state of a single core in the first storage means for controlling transfer of a signal from the remaining cores of the first storage means to the cores of either the second or third storage means in step with the progress of a rolling cut of cars through the classification yard.

17. In a control circuit for a railway car classification yard, the combination comprising a plurality of columns of apertured magnetic cores, means responsive to the remanent magnetic state of a single core in each column for priming a selected aperture in each of the remaining cores in said column, means coupling an output from a first selected aperture of each of said remaining cores in a single column to the input of a separate core in a first successive column of cores whereby every core in said first successive column receives an input, and means coupling an output from a second selected aperture in each of said remaining cores in said single column to the input of a separate core in a second successive column of cores whereby every core in said second successive column receives an input, said first and second successive columns comprising one less core than said single column.

18. The control means of claim 17 having additional means coupling an output from a first selected aperture of each of said remaining cores in said first and second successive columns to the input of a single core in a third and fourth successive column of cores respectively whereby every core in said third and fourth successive columns receive an input, means coupling an output from a second selected aperture of each of said remaining cores in said first and second successive columns to the input of a single core in a fifth and sixth successive columns of cores respectively whereby every core in said fifth and sixth successive columns receives an input, said third, fourth, fifth and sixth successive columns comprising two less cores than said single column.

References Cited by the Examiner

UNITED STATES PATENTS

| | | | |
|---|---|---|---|
| 2,851,590 | 9/1958 | Venning et al. | 246—134 |
| 2,910,578 | 10/1959 | Karlet et al. | 246—2 |
| 3,218,464 | 11/1965 | Goatcher | 340—174 |

EUGENE G. BOTZ, *Primary Examiner.*